US011977249B2

(12) United States Patent
Tang et al.

(10) Patent No.: US 11,977,249 B2
(45) Date of Patent: May 7, 2024

(54) OPTICAL DEVICE

(71) Applicant: TAIWAN SEMICONDUCTOR MANUFACTURING COMPANY LTD., Hsinchu (TW)

(72) Inventors: Cheng-Tse Tang, Hsinchu County (TW); Chewn-Pu Jou, Hsinchu (TW); Lan-Chou Cho, Hsinchu (TW); Ming Yang Jung, Kaohsiung (TW); Tai-Chun Huang, New Taipei (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 88 days.

(21) Appl. No.: 17/717,135

(22) Filed: Apr. 11, 2022

(65) Prior Publication Data

US 2023/0324596 A1  Oct. 12, 2023

(51) Int. Cl.
*F21V 8/00* (2006.01)
*G02B 6/122* (2006.01)
*G02B 6/293* (2006.01)
*G02B 6/12* (2006.01)

(52) U.S. Cl.
CPC ......... *G02B 6/0043* (2013.01); *G02B 6/1228* (2013.01); *G02B 6/29338* (2013.01); *G02B 2006/12097* (2013.01)

(58) Field of Classification Search
CPC ............. G02B 6/29338; G02B 6/2934; G02B 6/29341
See application file for complete search history.

(56) References Cited

U.S. PATENT DOCUMENTS

| | | | | |
|---|---|---|---|---|
| 7,286,734 B2* | 10/2007 | Montgomery | ..... | G02B 6/29343 385/39 |
| 9,563,016 B1* | 2/2017 | Xu | ......... | G02F 1/0147 |
| 9,733,498 B2* | 8/2017 | Luo | ......... | G02F 1/025 |
| 11,733,455 B2* | 8/2023 | Liang | ...... | G02F 1/035 385/3 |
| 2010/0260453 A1* | 10/2010 | Block | ......... | G02B 6/2934 385/24 |
| 2016/0131844 A1* | 5/2016 | Yang | ...... | H01S 3/1608 359/345 |
| 2016/0238860 A1* | 8/2016 | Liang | ......... | G02B 6/29335 |
| 2017/0329086 A1* | 11/2017 | Latawiec | ......... | G02B 6/305 |
| 2019/0097378 A1* | 3/2019 | Choi | ......... | H01S 3/08018 |
| 2023/0014190 A1* | 1/2023 | Yuan | ......... | H01L 31/035281 |
| 2023/0168431 A1* | 6/2023 | Norman | ......... | G02F 1/015 385/24 |
| 2023/0251440 A1* | 8/2023 | Fini | ......... | H04B 10/60 385/30 |
| 2023/0324596 A1* | 10/2023 | Tang | ......... | G02B 6/12007 385/31 |

* cited by examiner

*Primary Examiner* — Rhonda S Peace
(74) *Attorney, Agent, or Firm* — WPAT LAW; Anthony King

(57) ABSTRACT

An optical device is provided. The optical device includes a ring waveguide and a bus waveguide. The ring waveguide includes a coupling region. The bus waveguide is disposed adjacent to and spaced apart from the coupling region of the ring waveguide. The bus waveguide includes a coupling structure corresponding to the coupling region.

20 Claims, 24 Drawing Sheets

OPTICAL DEVICE

BACKGROUND

As for optical devices such as ring resonators and ring modulators, decreasing losses is the primary task. For the ring resonator, a gap between waveguides determines coupling loss, coupling ratio, and process sensitivity. In addition, a smaller circumference causes an increase in the bending loss of the ring resonator. Improper waveguide dimension affects modulation loss, extinction ratio and modulation efficiency of the ring modulator.

BRIEF DESCRIPTION OF THE DRAWINGS

Aspects of the embodiments of the present disclosure are best understood from the following detailed description when read with the accompanying figures. It should be noted that, in accordance with the standard practice in the industry, various structures are not drawn to scale. In fact, the dimensions of the various structures may be arbitrarily increased or reduced for clarity of discussion.

DETAILED DESCRIPTION

Figure 1:
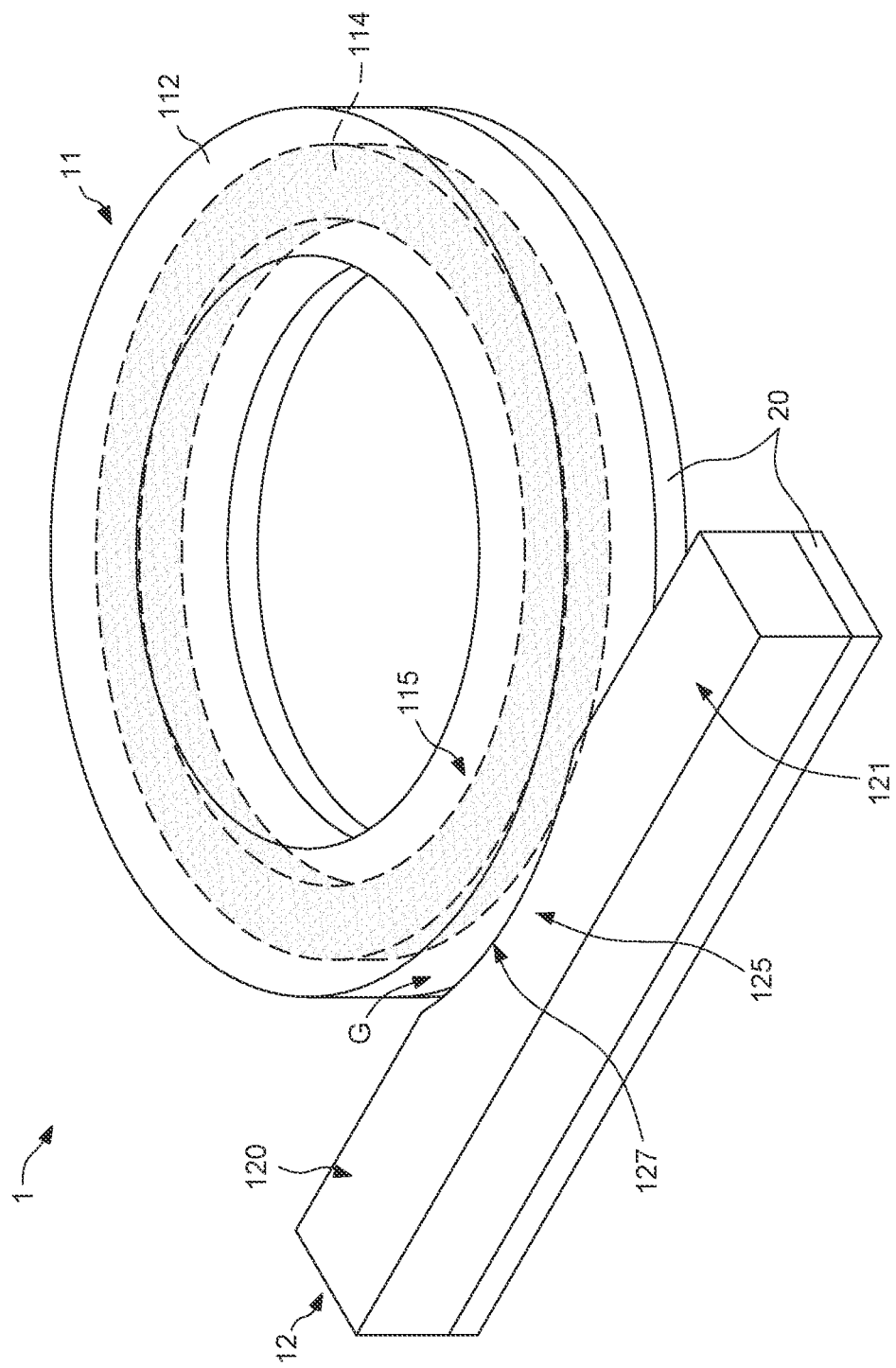
FIG. 1 illustrates a perspective view of an optical device according to some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although terms such as "first," "second" and "third" describe various elements, components, regions, layers and/or sections, these elements, components, regions, layers and/or sections should not be limited by these terms. These terms may only be used to distinguish one element, component, region, layer or section from another. Terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Figure 2:
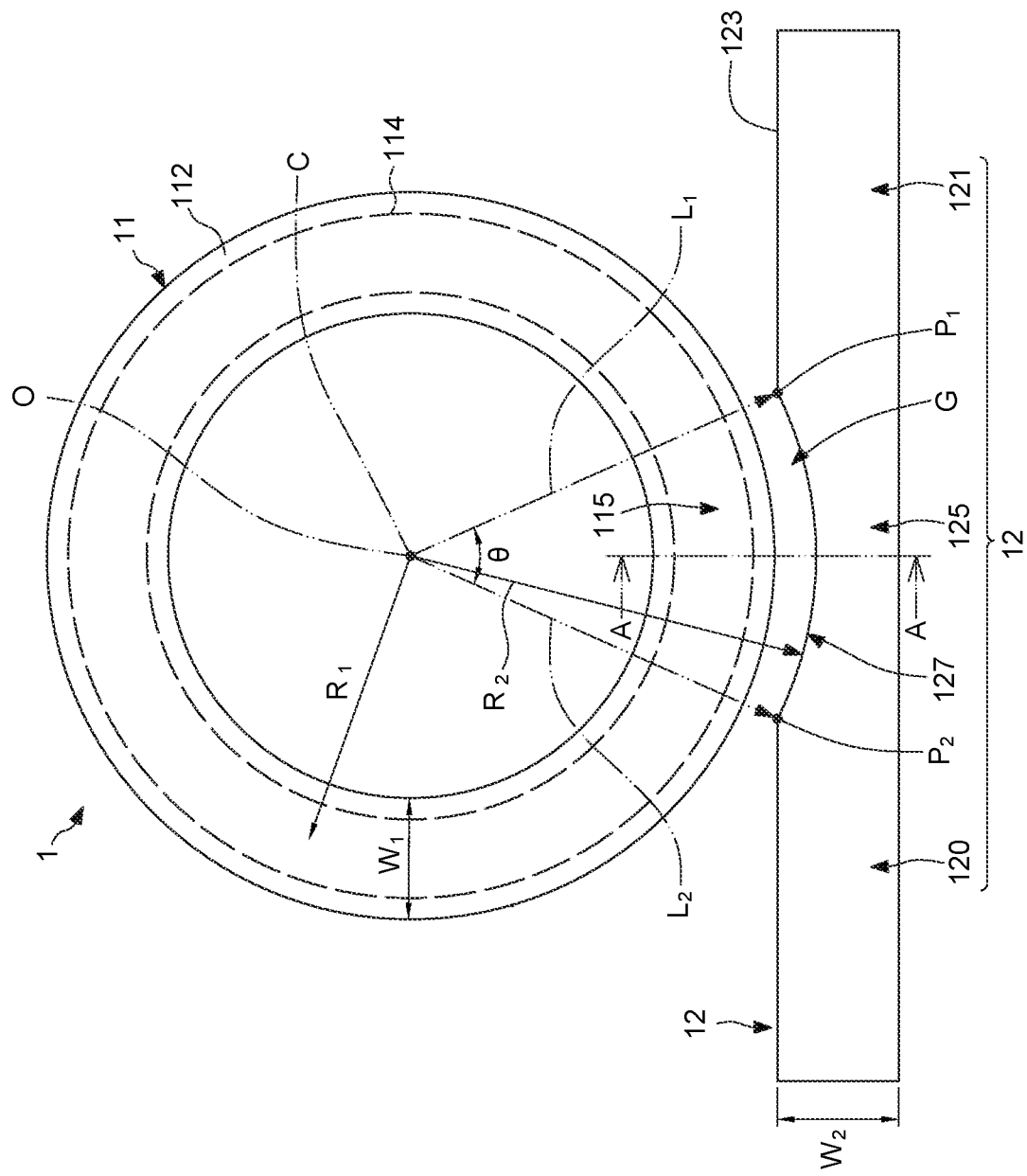
FIG. 2 illustrates a top view of FIG. 1.
Figure 3:
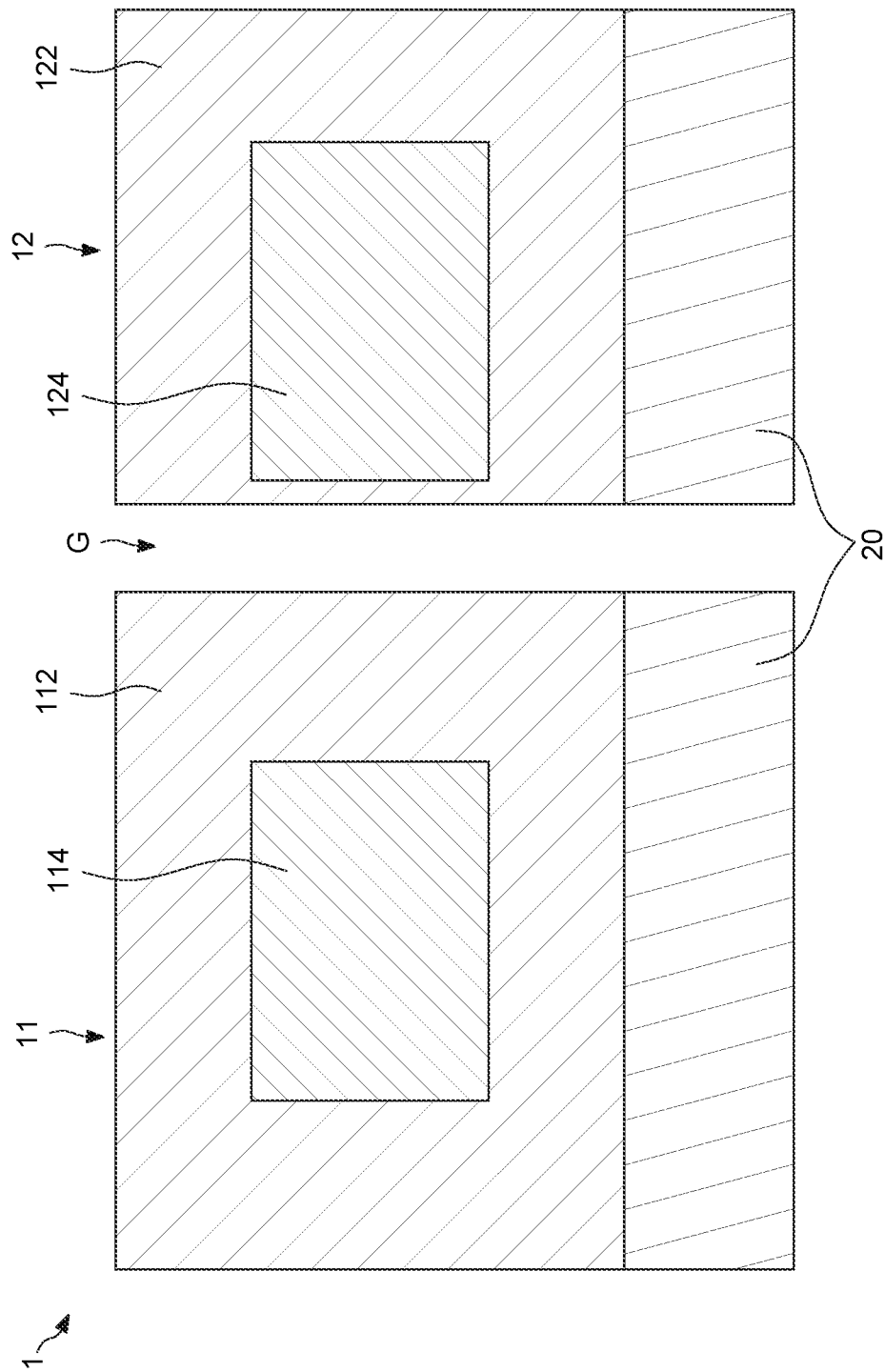
FIG. 3 illustrates a cross-sectional view along line A-A of FIG. 2.

FIG. 1 illustrates a perspective view of an optical device 1 according to some embodiments of the present disclosure. FIG. 2 illustrates a top view of FIG. 1. FIG. 3 illustrates a cross-sectional view along line A-A of FIG. 2. The optical device 1 includes a ring waveguide 11 and a bus waveguide 12. In some embodiments, the optical device 1 can be a ring resonator.

As shown in FIG. 2 and FIG. 3, the ring waveguide 11 is disposed or formed on a substrate 20. The substrate 20 can be, for example, silicon substrate. The ring waveguide 11 includes a cladding material 112 and a slab waveguide portion 114. The cladding material 112 can be, for example, a low-dielectric constant (low-κ) material or a low-refractive index material. The low-K material can be, for example, fluorinated silicon oxide (SiOF) or carbon-doped silicon oxide (SiOCH). The slab waveguide portion 114 is embedded in the cladding material 112. A material of the slab waveguide portion 114 can be, for example, a high-dielectric constant (high-κ) material or a high-refractive index material. The high-κ material can be, for example, zirconium dioxide ($ZrO_2$), hafnium silicate ($HfSiO_4$), hafnium dioxide ($HfO_2$), titanium dioxide ($TiO_2$), strontium titanate ($SrTiO_3$), tantalum pentoxide ($Ta_2O_5$), or silicon germanium (a-SiGe:H).

In order to receive lights of resonant wavelengths form the bus waveguide 12, the ring waveguide 11 may include a coupling region 115 to perform total internal reflection and constructive interference therethrough. To reduce the bending loss, a radius $R_1$ of the ring waveguide 11 can be 1 μm to 1 mm, 10 μm to 1 mm, 10 μm to 100 μm, or 100 μm to 1 mm, and a width $W_1$ of the ring waveguide 11 can be 1 nm to 10 μm, 1 nm to 10 nm, 1 nm to 100 nm, 10 nm to 10 μm, or 10 nm to 100 nm.

The bus waveguide 12 is disposed or formed on the substrate 20. In some embodiments, the bus waveguide 12 is disposed adjacent to and spaced apart from the coupling region 115 of the ring waveguide 11. The bus waveguide 12 includes a cladding material 122 and a slab waveguide portion 124. The cladding material 122 can be, for example, a low-dielectric constant (low-κ) material or a low-refractive index material. The low-κ material can be, for example, fluorinated silicon oxide (SiOF) or carbon-doped silicon oxide (SiOCH). The slab waveguide portion 124 is embedded in the cladding material 122. A material of the slab waveguide portion 124 can be, for example, a high-dielectric constant (high-κ) material or a high-refractive index material. The high-κ material can be, for example, zirconium dioxide ($ZrO_2$), hafnium silicate ($HfSiO_4$), hafnium dioxide ($HfO_2$), titanium dioxide ($TiO_2$), strontium titanate ($SrTiO_3$), tantalum pentoxide ($Ta_2O_5$), or silicon germanium (a-SiGe:H).

In some embodiments, the bus waveguide 12 further includes an input portion 120, an output portion 121 and a coupling structure 125. The input portion 120 is configured to receive the lights of resonant wavelengths from exterior. The output portion 121 is opposite to the input portion 120. The coupling structure 125 is between the input portion 120 and the output portion 121 and corresponds to the coupling region 115 of the ring waveguide 11. A width of the input portion 121 may be equal to a width of the output portion 122, and a width of the coupling structure 125 is less than the width of the input portion 121 and the width of the output portion 122. In some embodiments, the input portion 121, the output portion 122 and the coupling structure 125 are formed concurrently and integrally. A side surface of the coupling structure 125 is substantially conformal with a side surface of the coupling region 115 of the ring waveguide 11.

As shown in FIG. 2 and FIG. 3, in some embodiments, the coupling structure 125 can include a taper-shaped coupler 127. The taper-shaped coupler 127 is recessed from a side surface 123 of the bus waveguide 12. A center of curvature C of the taper-shaped coupler 127 overlaps a center O of the ring waveguide 11. A radius of curvature $R_2$ of the taper-shaped coupler 127 is greater than a radius $R_1$ of the ring waveguide 11. In a cross-sectional view, the taper-shaped coupler 127 includes a central angle θ whose vertex is the center O of the ring waveguide 11 with two radii lines $L_1$, $L_2$ intersecting at two distinct points $P_1$, $P_2$ on the sidewall 123 of the bus waveguide 12. In some embodiments, a length (also referred to as "coupling length") of the taper-shaped coupler 127 is equal to a product of the central angle θ and the radius of curvature $R_2$ of the taper-shaped coupler 127. In some embodiments, the radius $R_1$ of the ring waveguide 11 can be 1 μm to 1 mm. To get adjustable coupling ratio, in some embodiments, the central angle θ can be greater than 0 degree and less than 180 degrees, greater than 0 degree and less than 90 degrees, greater than 0 degree and less than 60 degrees, greater than 0 degree and less than 45 degrees, or greater than 0 degree and less than 30 degrees.

In some embodiments, a width $W_2$ of the bus waveguide 12 can be different from the width $W_1$ of the ring waveguide 11. In some embodiments, the width $W_1$ of the rib waveguide 11 can be 1 nm to 10 μm. The width $W_2$ of the bus waveguide 12 can also be 1 nm to 10 μm.

As shown in FIG. 2, an arc-shaped gap G is between the coupling region 115 and the coupling structure 125 (e.g., the taper-shaped coupler 127), which may provide a plurality of coupling portion for the lights of resonant wavelengths. The arc-shaped gap G is defined by the side surface of the coupling structure 125 and the side surface of the coupling region 115 of the ring waveguide 11. The arc-shaped gap G has a consistent width. The width of the arc-shaped gap G can be 1 nm to 10 μm, 1 nm to 10 nm, 1 nm to 100 nm, 10 nm to 10 μm, or 10 nm to 100 nm. The width of the arc-shaped gap G may be less than a width of the coupling structure 125 of the bus waveguide 12 or a width of the coupling region 115 of the ring waveguide 11.

When the light of resonant wavelength passes through the ring waveguide 11 from the input portion 120 of the bus waveguide 12, it builds up in light intensity over multiple round-trips due to the constructive interference and is output to the output portion 121 of the bus waveguide 12. Since only the selected wavelengths will be at resonance within the ring waveguide 11, the optical device 1 functions as a filter. In some embodiments, two or more ring waveguides 11 can be coupled to each other to form an add/drop optical filter.

In the embodiment illustrated in FIG. 1 to FIG. 3, the arc-shaped gap G can provide a high tolerance in the process of manufacturing the optical device 1 (i.e., insensitive to the process) and decrease coupling losses. Further, a desired coupling ratio and an improved quality factor can be obtained by adjusting the central angle θ of the taper-shaped coupler 127 and the width of the arc-shaped gap G.

Figure 4:
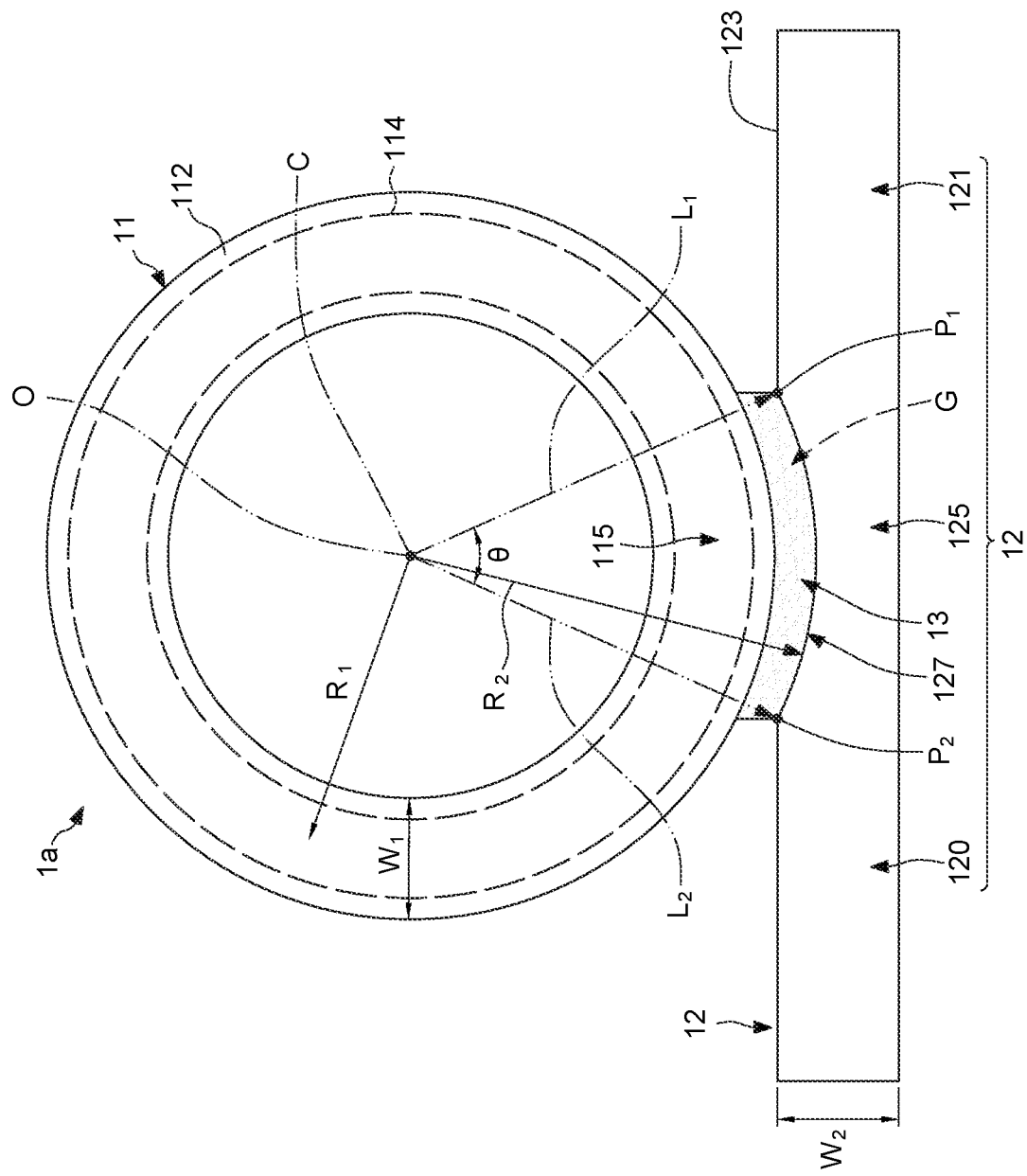
FIG. 4 illustrates a top view of an optical device according to some embodiments of the present disclosure.

FIG. 4 illustrates a top view of an optical device 1a according to some embodiments of the present disclosure. The optical device 1a of FIG. 4 is similar to the optical device 1 of FIG. 2, except that the optical device 1a further includes a coupling material 13. The coupling material 13 can be, for example, a high-dielectric constant (high-κ) material or a high-refractive index material. The high-κ material can be, for example, zirconium dioxide ($ZrO_2$), hafnium silicate ($HfSiO_4$), hafnium dioxide ($HfO_2$), titanium dioxide ($TiO_2$), strontium titanate ($SrTiO_3$), tantalum pentoxide ($Ta_2O_5$), or silicon germanium (a-SiGe:H). In some embodiments, a dielectric constant of the coupling material 13 can be greater than a dielectric constant of silicon dioxide as well as a refractive index of the coupling material 13 can be greater than a refractive index of silicon dioxide. As shown in FIG. 4, the coupling material 13 covers the arc-shaped gap G to obtain different coupling coefficient (also referred to as "coupling strength"). In some embodiments, the coupling material 13 may fulfill the arc-shaped gap G. In some embodiments, the coupling material 13 can be a transparent semiconductor material.

Figure 5:
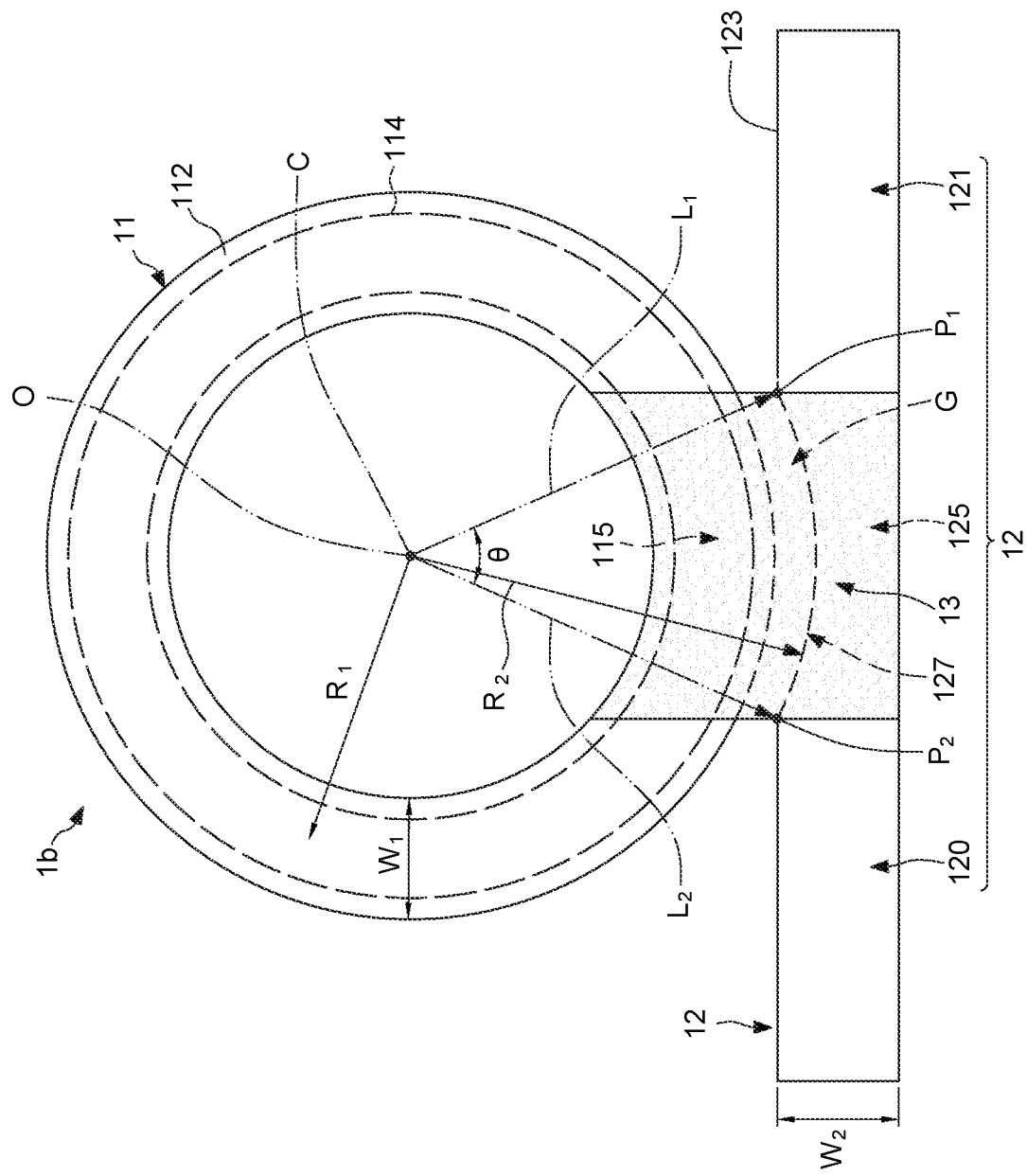
FIG. 5 illustrates a top view of an optical device according to some embodiments of the present disclosure.

FIG. 5 illustrates a top view of an optical device 1b according to some embodiments of the present disclosure. The optical device 1b of FIG. 5 is similar to the optical device 1a of FIG. 4, except that the coupling material 13 further covers a portion of the coupling region 115 and a portion of the coupling structure 125. In some embodiments, the cladding material 112 in the coupling region 115 can be a portion of the coupling material 13. Similarly, the cladding material 122 in the coupling structure 125 can also be a portion of the coupling material 13. That is, the cladding material 112 in the coupling region 115 and the cladding material 122 in the coupling structure 125 can be removed and replaced by the coupling material 13. Thus, the coupling material 13 may cover and contact the slab waveguide portion 114 and the slab waveguide portion 124 concurrently.

Figure 6:
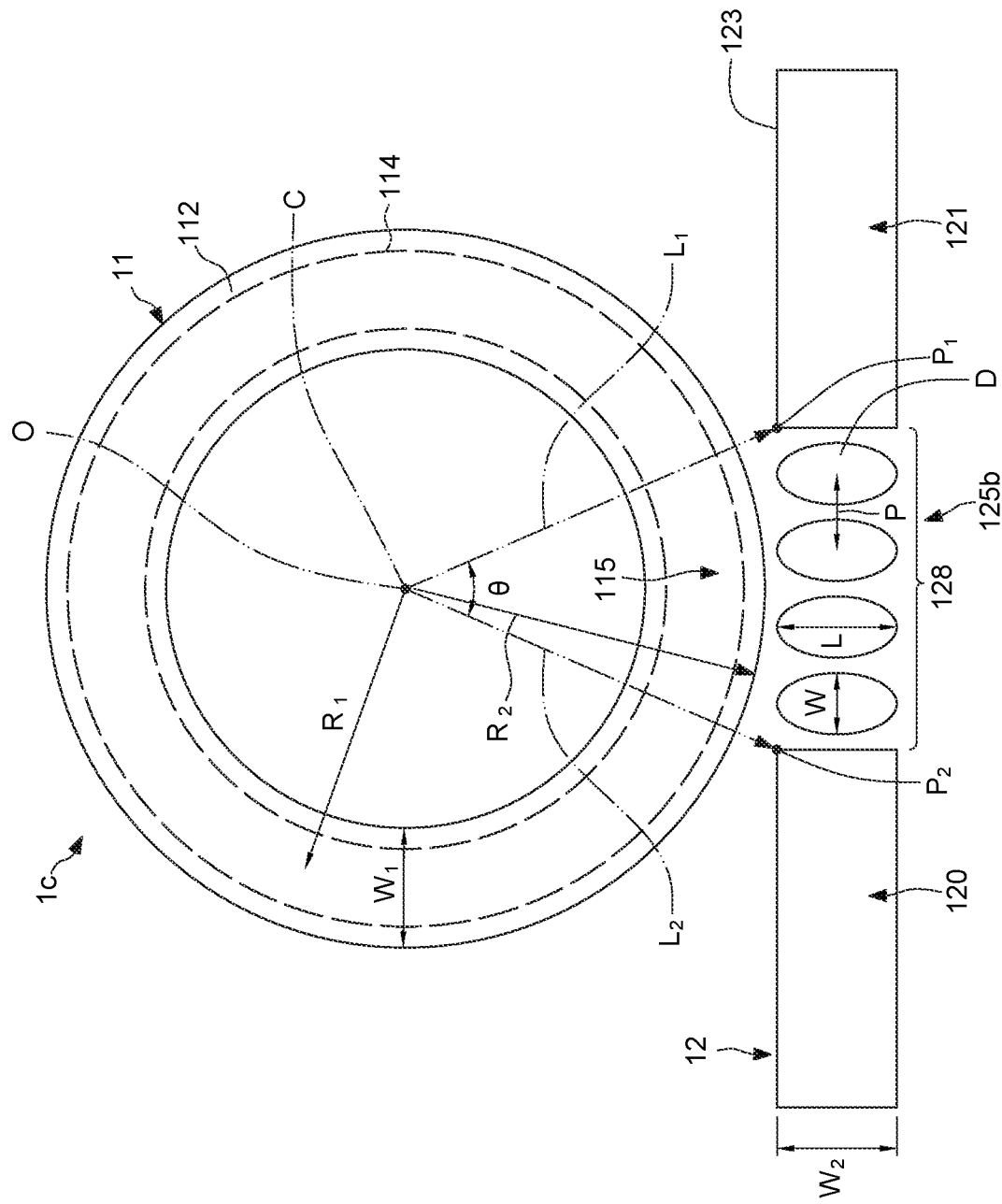
FIG. 6 illustrates a top view of an optical device according to some embodiments of the present disclosure.

FIG. 6 illustrates a top view of an optical device 1c according to some embodiments of the present disclosure. The optical device 1c of FIG. 6 is similar to the optical device 1 of FIG. 2, except for a structure of the coupling structure 125b of the bus waveguide 12. As shown in FIG. 6, the coupling structure 125b may include a subwavelength coupler 128. The subwavelength coupler 128 is constituted by a plurality of waveguide dots D spaced a pitch P from each other, which can provide design flexibility to vary effective refractive indices, leading to different coupling coefficient. In some embodiments, the pitch P can be 10 nm to 10 μm. A width W of the waveguide dot D can be 10 nm to 10 μm. A length L of the waveguide dot D can be 10 nm to 10 μm. Each of the waveguide dots D may be in an elliptical shape. A width of each of the waveguide dots D may be less than or equal to the width of the input portion 121 and the width of the output portion 122.

Figure 7:
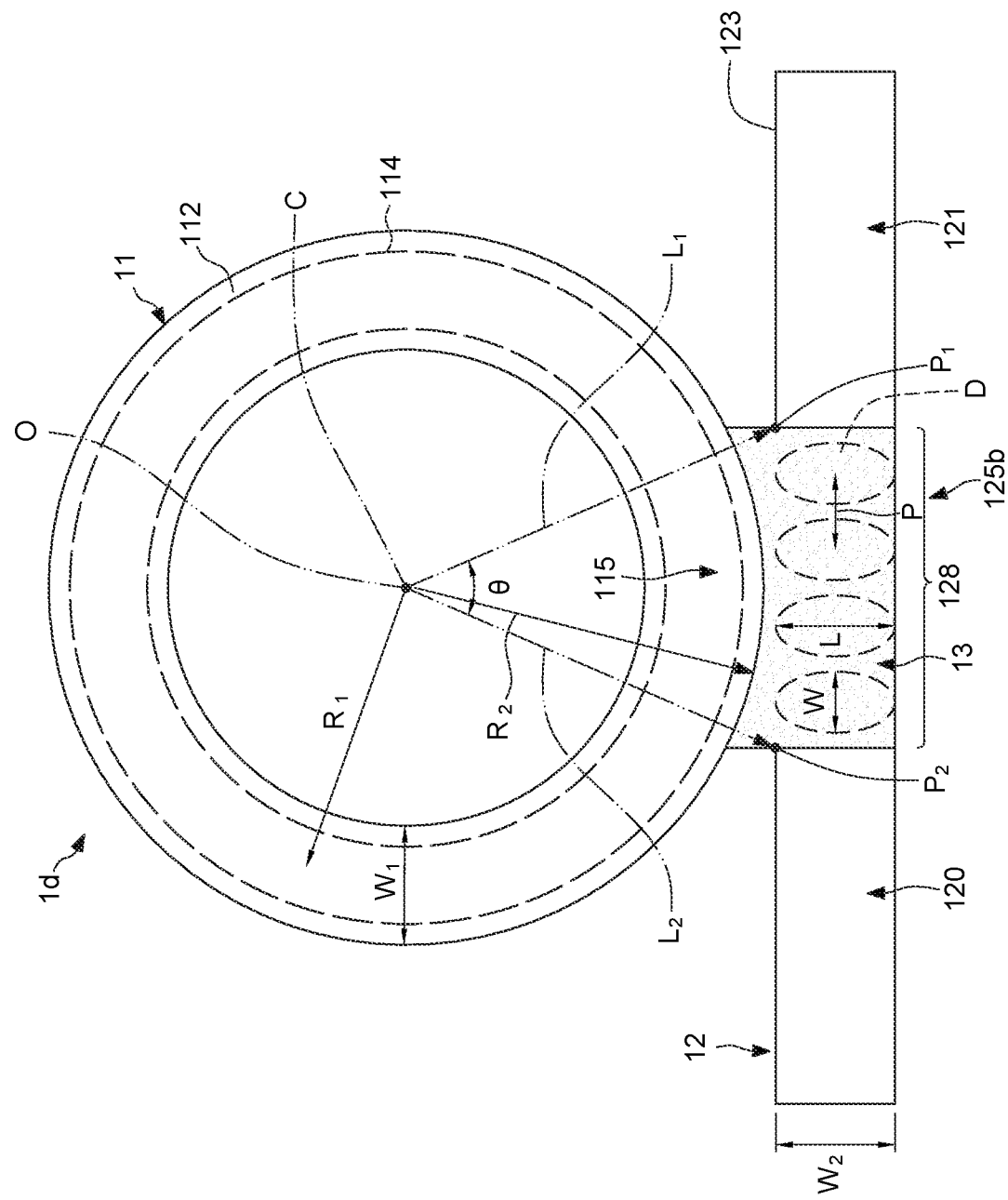
FIG. 7 illustrates a top view of an optical device according to some embodiments of the present disclosure.

FIG. 7 illustrates a top view of an optical device 1d according to some embodiments of the present disclosure. The optical device 1d of FIG. 7 is similar to the optical device 1c of FIG. 6, except that the optical device 1d further includes a coupling material 13. The coupling material 13 can be, for example, a high-dielectric constant (high-κ) material or a high-refractive index material. The high-κ material can be, for example, zirconium dioxide ($ZrO_2$), hafnium silicate ($HfSiO_4$), hafnium dioxide ($HfO_2$), titanium dioxide ($TiO_2$), strontium titanate ($SrTiO_3$), tantalum pentoxide ($Ta_2O_5$), or silicon germanium (a-SiGe:H). In some embodiments, a dielectric constant of the coupling material 13 can be greater than a dielectric constant of silicon dioxide as well as a refractive index of the coupling material 13 can be greater than a refractive index of silicon dioxide. As shown in FIG. 6, the coupling material 13 covers the subwavelength coupler 128 (including, for example, the waveguide dots D) to obtain different coupling coefficient. In some embodiments, the coupling material 13 can be a transparent semiconductor material.

Figure 8:
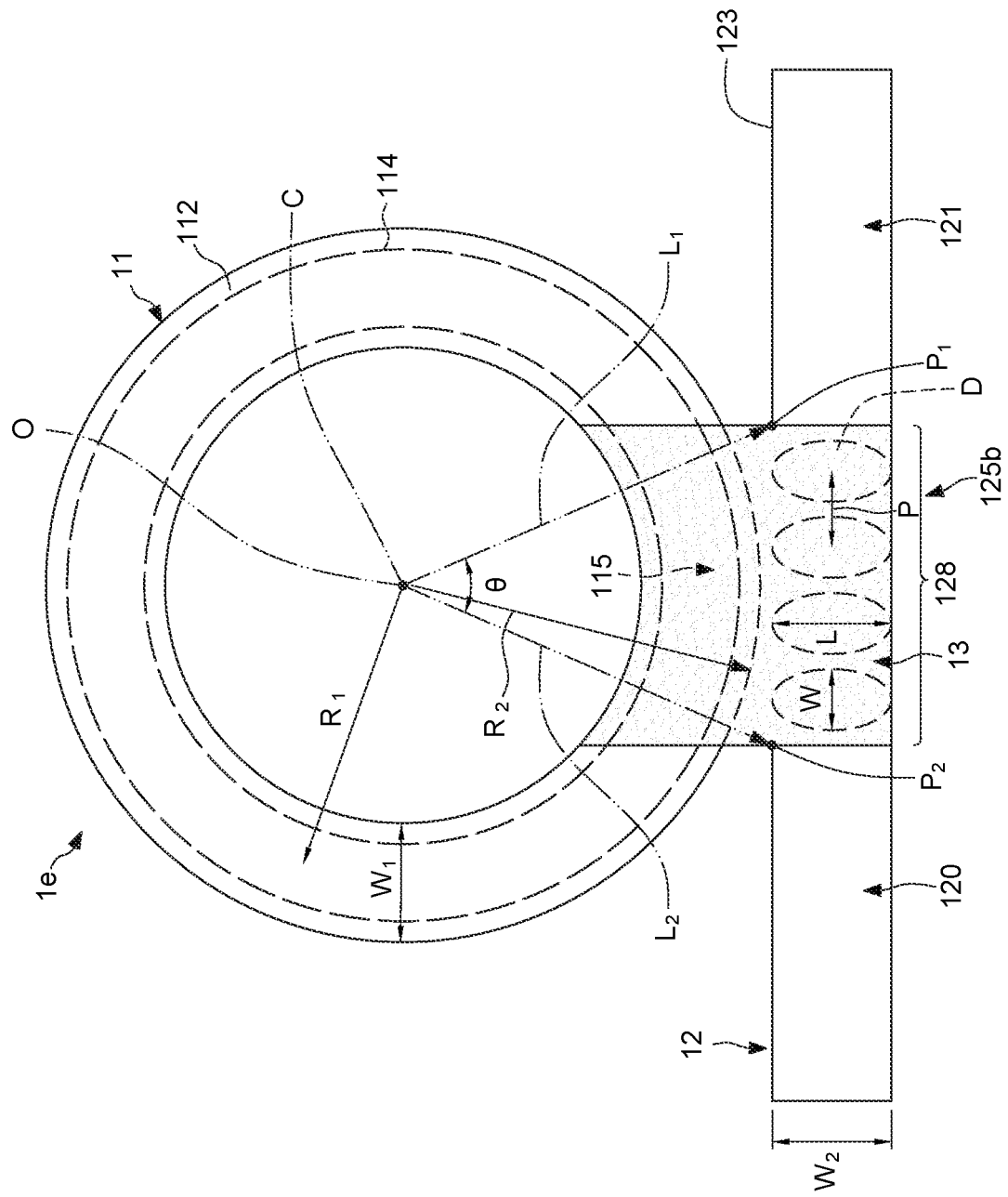
FIG. 8 illustrates a top view of an optical device according to some embodiments of the present disclosure.

FIG. 8 illustrates a top view of an optical device 1e according to some embodiments of the present disclosure. The optical device 1e of FIG. 8 is similar to the optical device 1d of FIG. 7, except that the coupling material 13 furthers cover a portion of the coupling region 115. In some embodiments, the cladding material 112 in the coupling region 115 can be a portion of the coupling material 13. That is, the cladding material 112 in the coupling region 115 can be removed and replaced by the coupling material 13. Thus, the coupling material 13 may cover and contact the slab waveguide portion 114 and the slab waveguide portion 124 concurrently.

Figure 9:
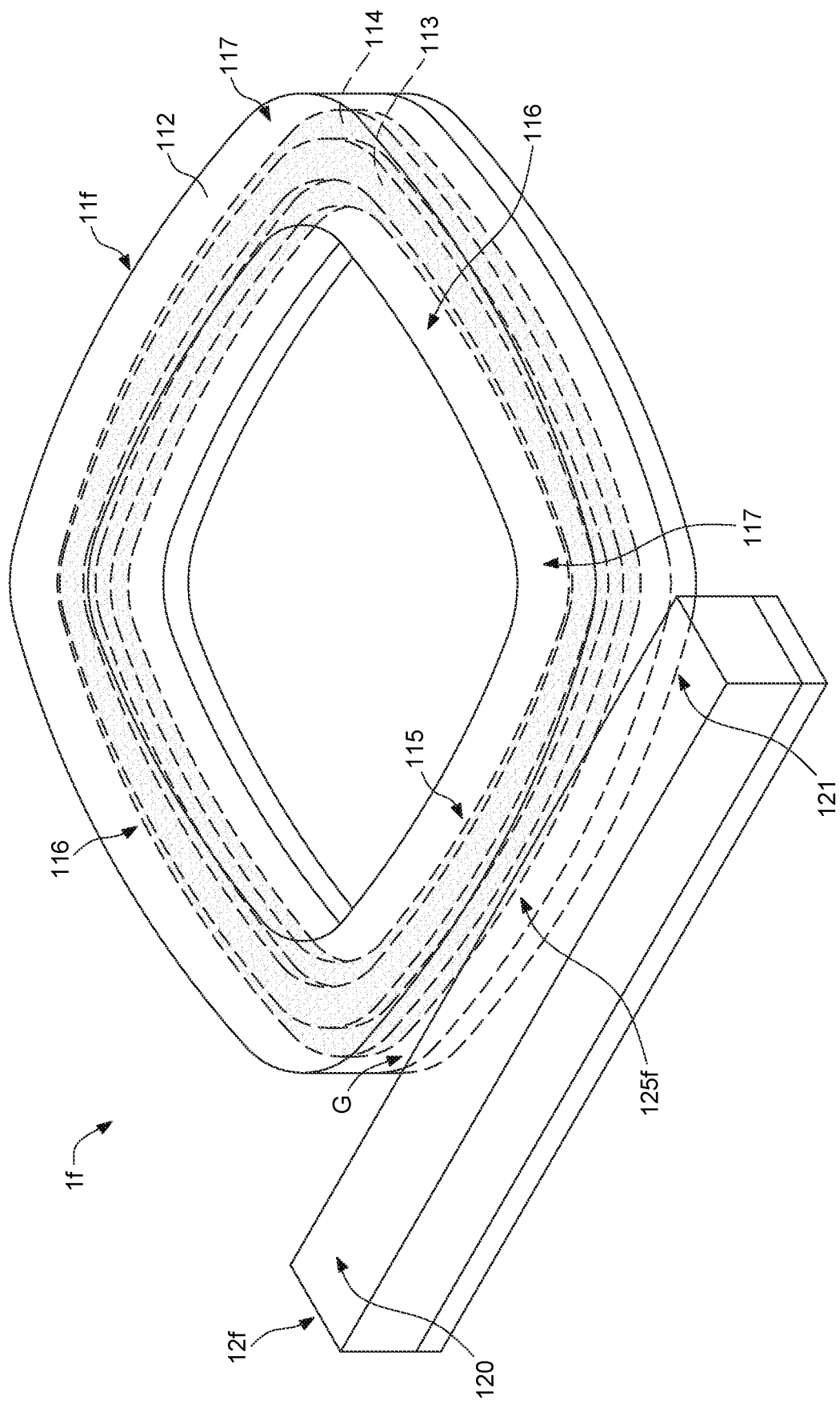
FIG. 9 illustrates a perspective view of an optical device according to some embodiments of the present disclosure.
Figure 10:
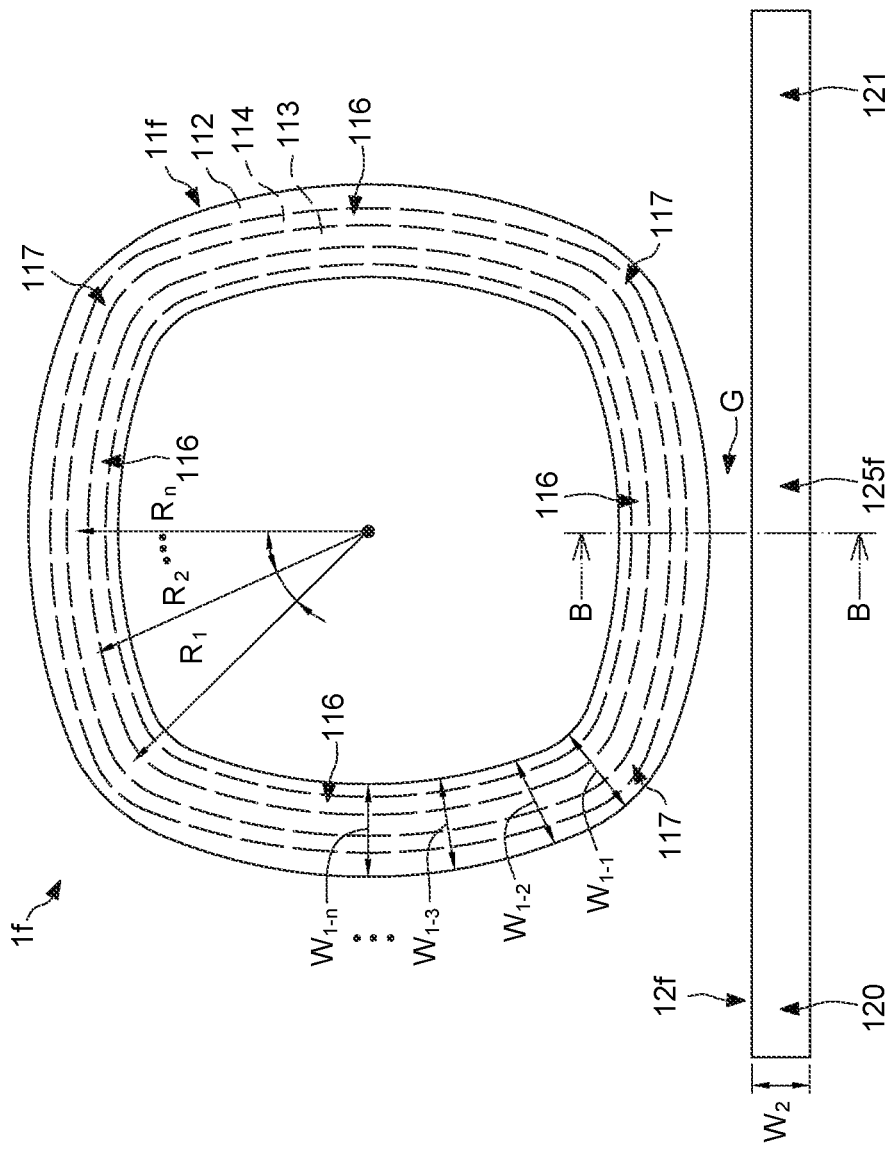
FIG. 10 illustrates a top view of FIG. 9.
Figure 11:
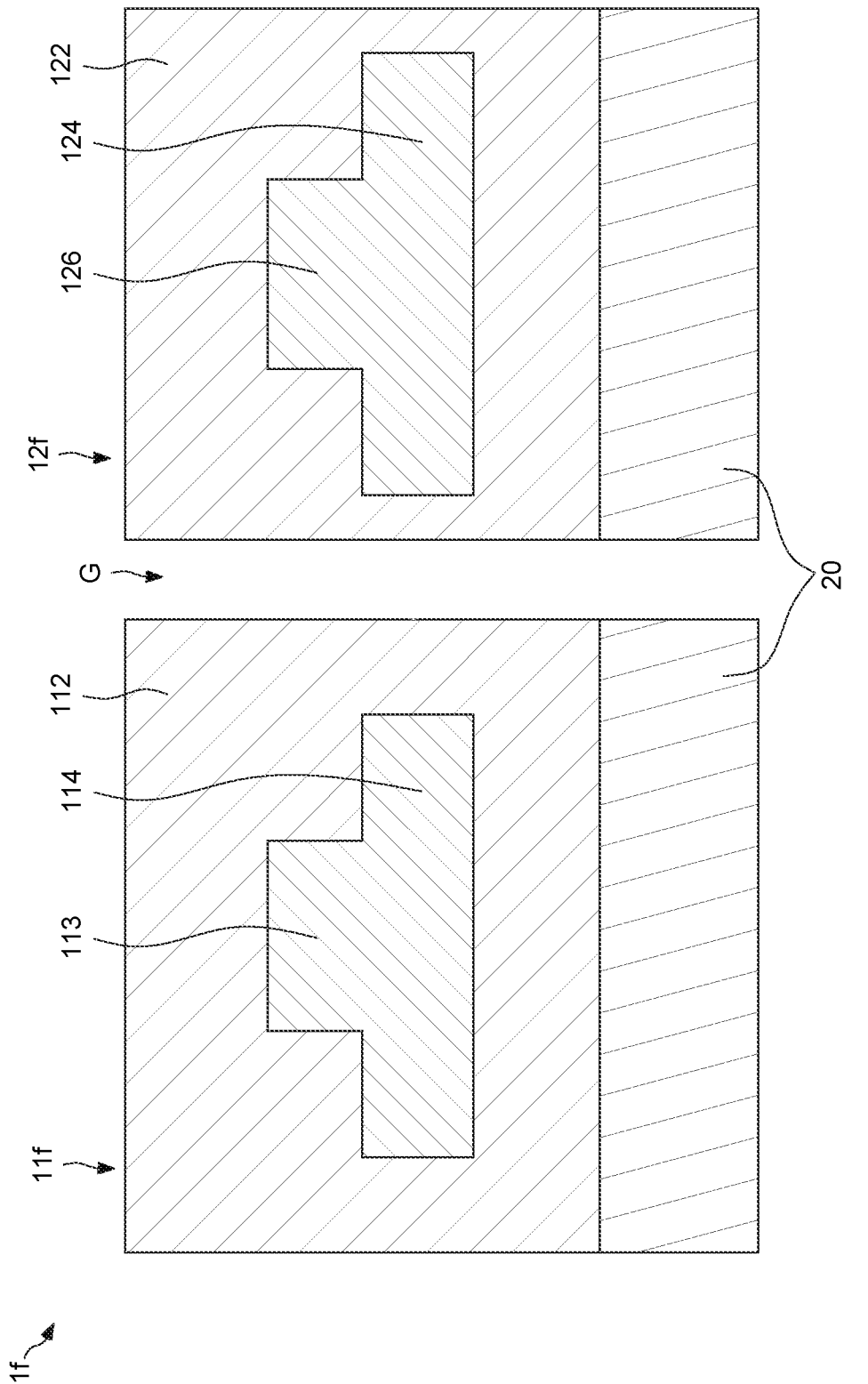
FIG. 11 illustrates a cross-sectional view along line B-B of FIG. 10.

FIG. 9 illustrates a perspective view of an optical device 1f according to some embodiments of the present disclosure. FIG. 10 illustrates a top view of FIG. 9. FIG. 11 illustrates a cross-sectional view along line B-B of FIG. 10. The optical device 1f of FIG. 10 is similar to the optical device 1 of FIG. 2, except for a structure of the ring waveguide 11f and a structure of the bus waveguide 12f. The optical device 1f can be, for example, a ring resonator. As shown in FIG. 10, the ring waveguide 11f has a plurality of different radii of curvature (including, for example, radii of curvature $R_1$-$R_n$) and a plurality of different widths (including, for example, widths $W_{1-1}$-$W_{1-n}$) in profile, which may control conditions of constructive and destructive interferences to adjust a free spectrum range (FSR), leading to reduced bending loss and improved quality factors of the ring resonator. The ring waveguide 11f includes a plurality of resonating zones 116 connected to each other through a corner zone 117. The radius (e.g., $R_n$) of curvature of the resonating zone 116 is different from the radius (e.g., $R_1$) of curvature of the corner zone 117. The width (e.g., $W_{1-n}$) of the resonating zone 116 is different from the width (e.g., $W_{1-1}$) of the corner zone 117. In some embodiments, the width of the resonating zone 116 may gradually increase from a center of the resonating zone 116 toward the corner zone 117. That is, the width (e.g., $W_{1-n}$) of the resonating zone 116 is less than the width (e.g., $W_{1-1}$) of the corner zone 117. In addition, a dielectric constant of the cladding material 112 can be 1 to 10 to obtain better confinement of optical modes, leading to decreased bending loss.

In some embodiments, as shown in FIG. 11, the ring waveguide 11f may further include a rib waveguide portion 113 protruding from a top surface of the slab waveguide portion 114. The taper-shaped coupler 127 of the coupling structure 125 of the bus waveguide 12 of FIGS. 1 and 2 is omitted. That is, the coupling structure 125f is straight in shape. Thus, the width of the input portion 121 may be equal to the width of the output portion 122 and the width of the coupling structure 125f. In addition, the bus waveguide 12f may further include a rib waveguide portion 126 protruding from a top surface of the slab waveguide portion 124.

Figure 12:
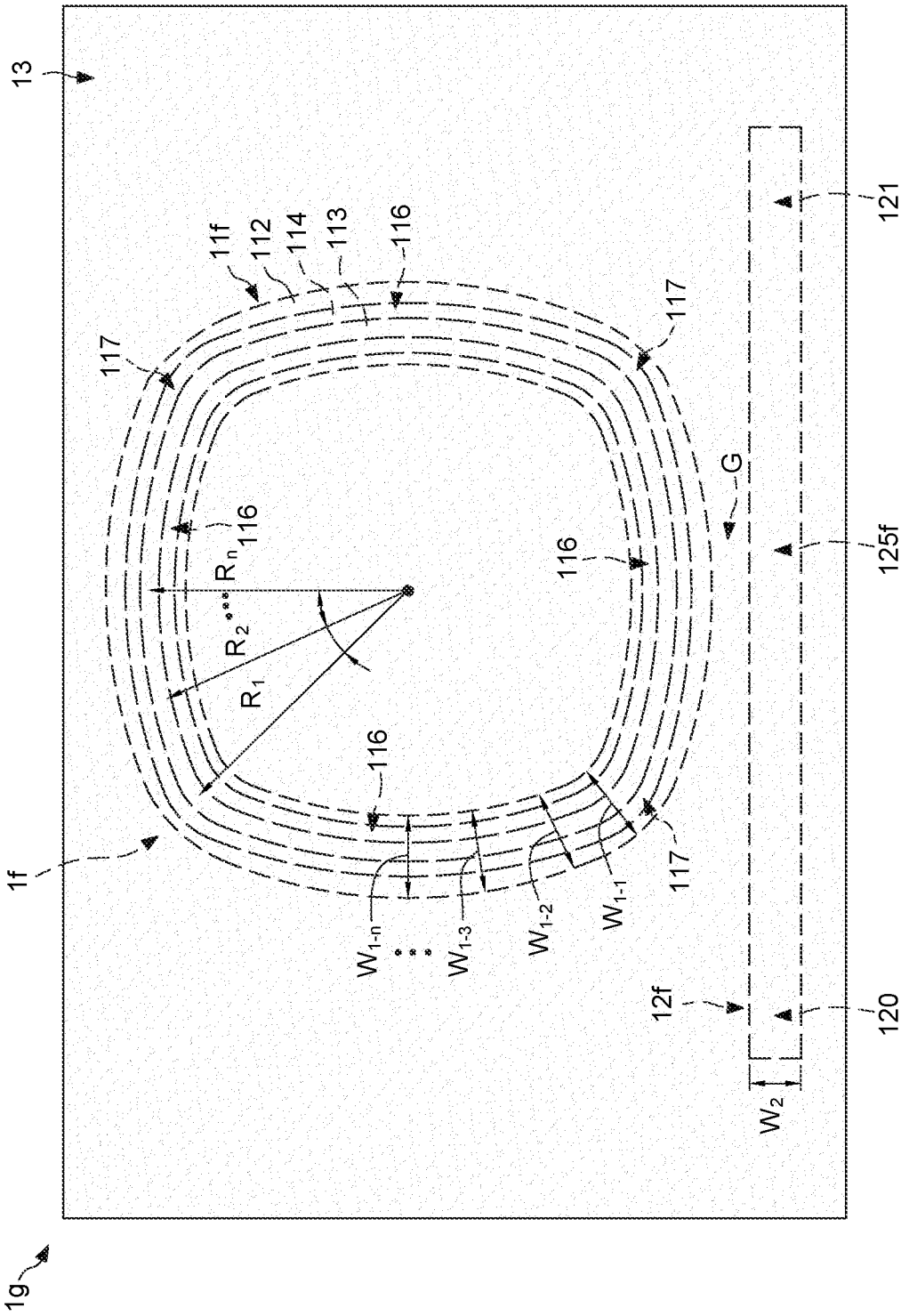
FIG. 12 illustrates a top view of an optical device according to some embodiments of the present disclosure.

FIG. 12 illustrates a top view of an optical device 1g according to some embodiments of the present disclosure. The optical device 1g of FIG. 12 is similar to the optical device 1f of FIG. 10, except that the optical device 1g further includes a coupling material 13. The coupling material 13 can be, for example, a low-dielectric constant (low-κ) material. The low-κ material can be, for example, fluorinated silicon oxide (SiOF) or carbon-doped silicon oxide (SiOCH). As shown in FIG. 12, the coupling material 13 covers the ring waveguide 11f and the bus waveguide 12f to obtain better confinement of optical modes, leading to decreased bending loss. In some embodiments, a dielectric constant of the coupling material 13 can be 1 to 10. In some embodiments, the cladding material 112 of the ring waveguide 11*f* and the cladding material 122 (FIG. 11) of the bus waveguide 12*f* can be a portion of the coupling material 13. That is, the cladding material 112 of the ring waveguide 11*f* and the cladding material 122 (FIG. 11) of the bus waveguide 12*f* can be removed and replaced by the coupling material 13.

Figure 13:
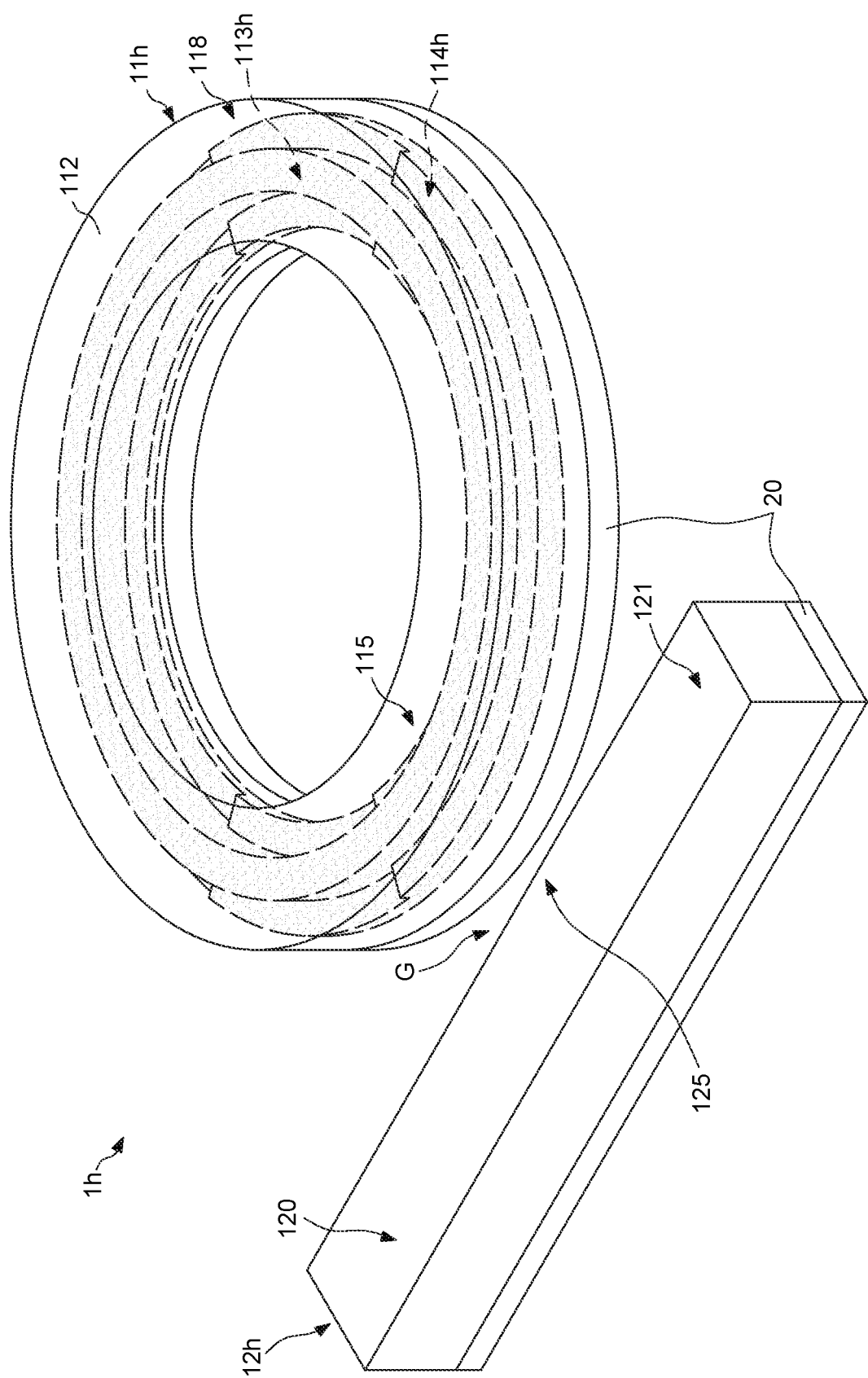
FIG. 13 illustrates a perspective view of an optical device according to some embodiments of the present disclosure.
Figure 14:
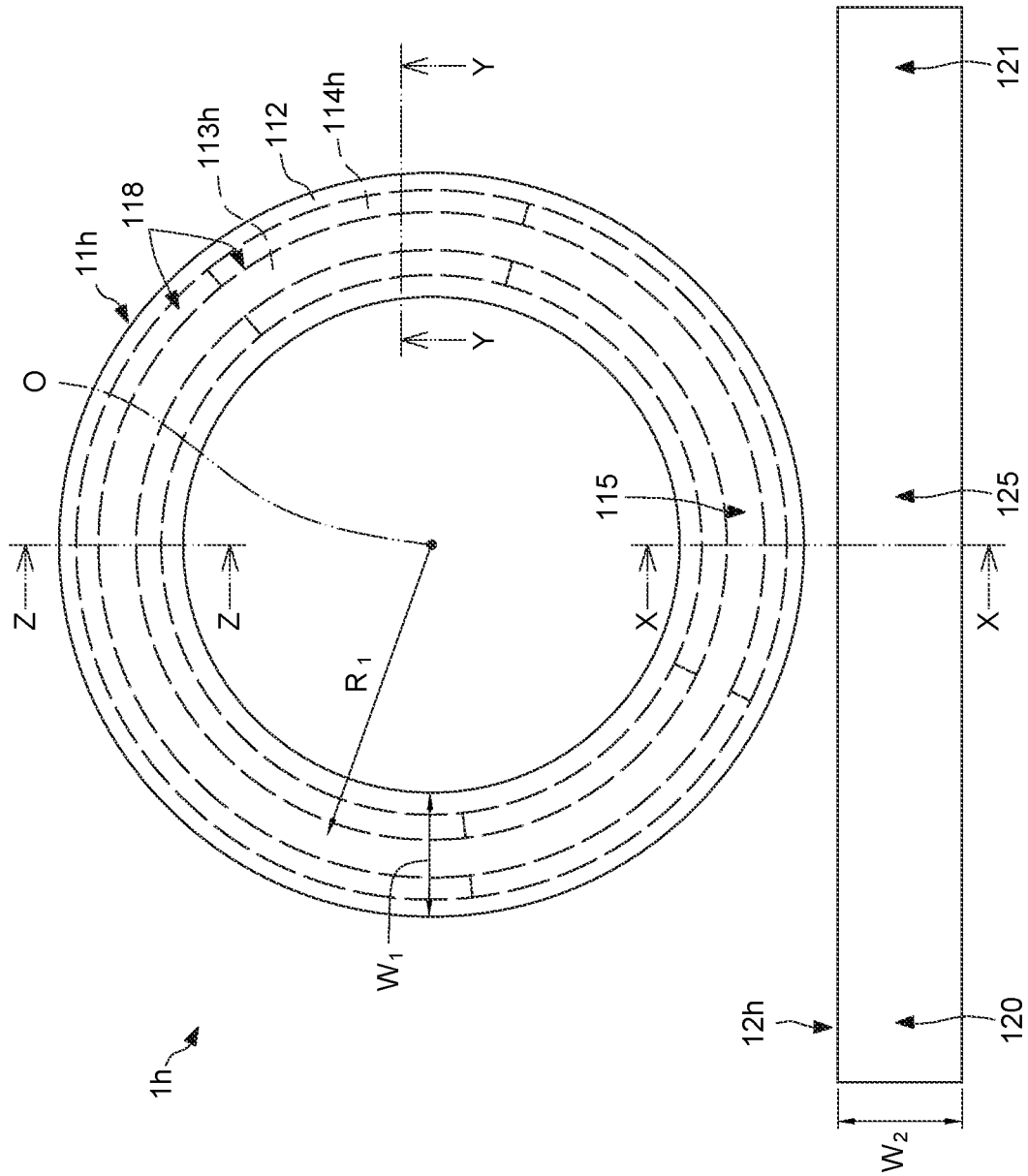
FIG. 14 illustrates a top view of FIG. 13.
Figure 15A:
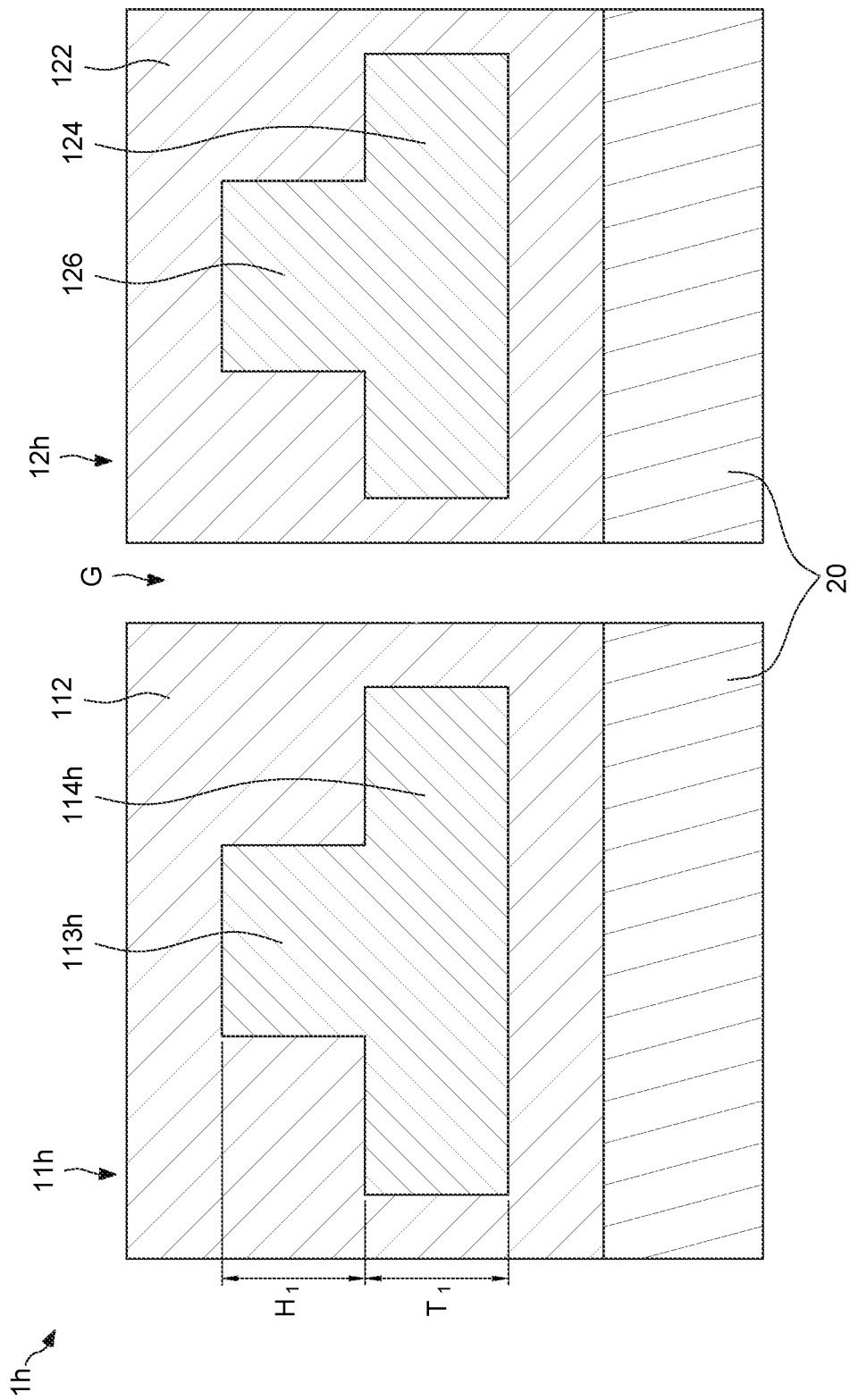
FIG. 15A illustrates a cross-sectional view along line X-X of FIG. 14.
Figure 15B:
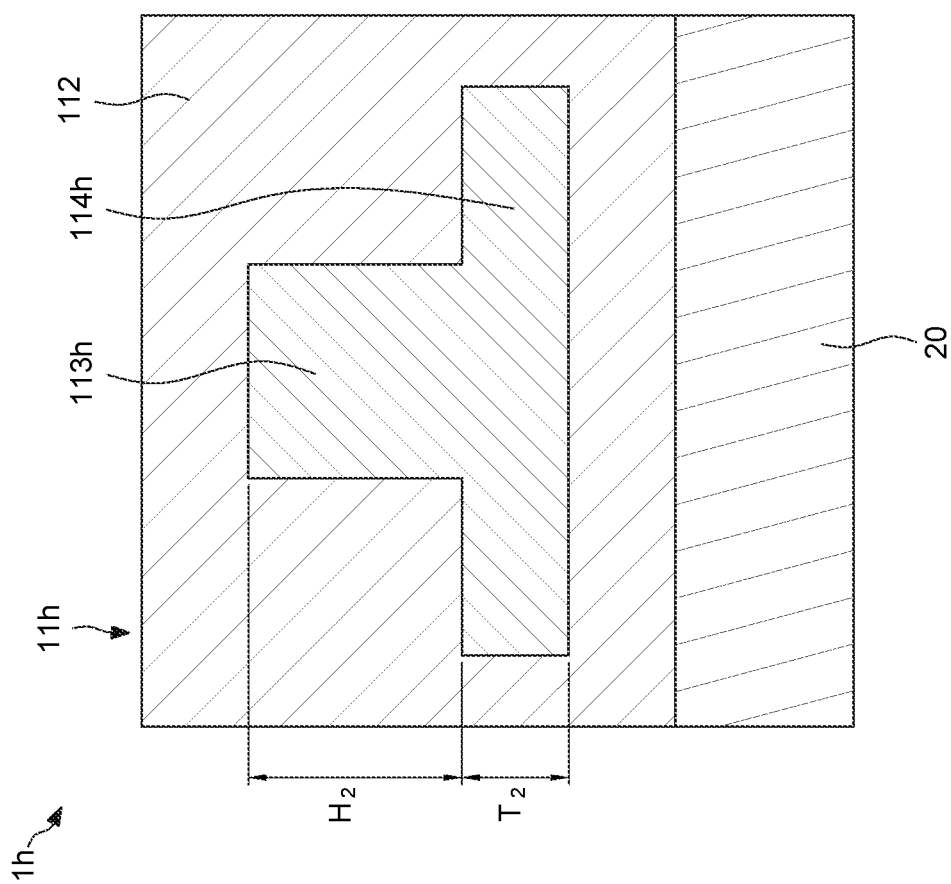
FIG. 15B illustrates a cross-sectional view along line Y-Y of FIG. 14.
Figure 15C:
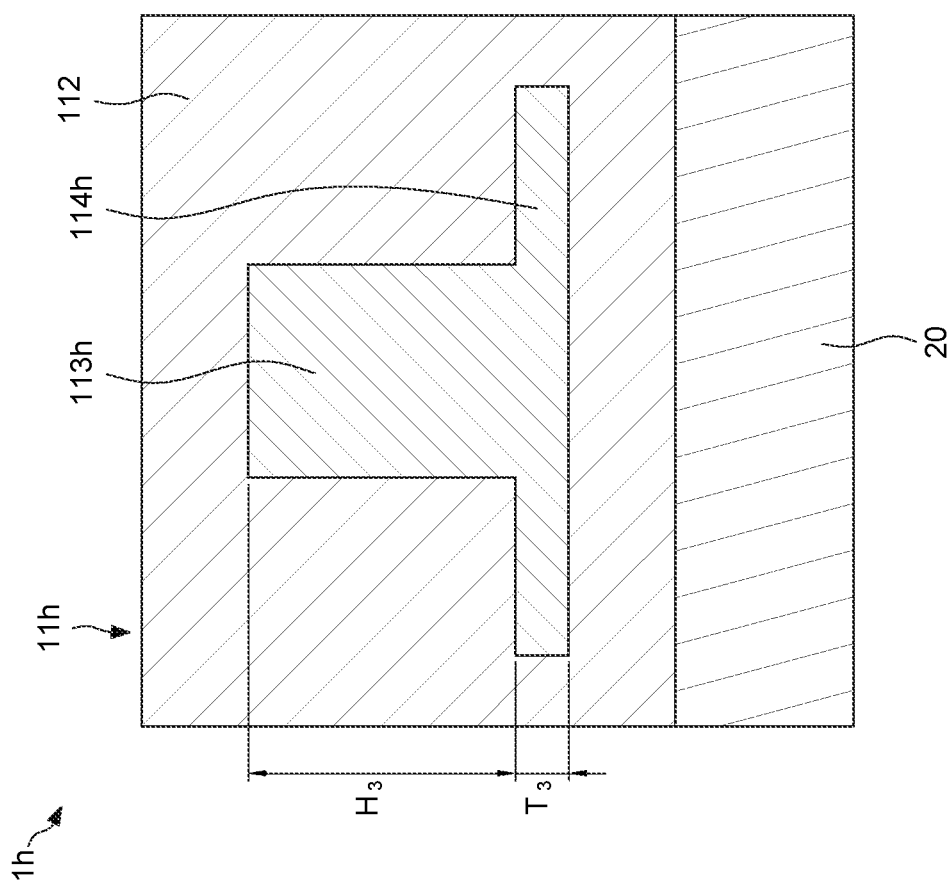
FIG. 15C illustrates a cross-sectional view along line Z-Z of FIG. 14.

FIG. 13 illustrates a perspective view of an optical device 1*h* according to some embodiments of the present disclosure. FIG. 14 illustrates a top view of FIG. 13. FIG. 15A illustrates a cross-sectional view along line X-X of FIG. 14. FIG. 15B illustrates a cross-sectional view along line Y-Y of FIG. 14. FIG. 15C illustrates a cross-sectional view along line Z-Z of FIG. 14. The optical device 1*h* of FIG. 13 is similar to the optical device 1 of FIG. 1, except for a structure of the ring waveguide 11*h* and a structure of the bus waveguide 12*h*. The optical device 1*h* can be a ring resonator and applied to a ring modulator. As shown in FIGS. 13 and 15A-15C, the ring waveguide 11*h* further includes a rib waveguide portion 113*h* protruding from a top surface of the slab waveguide portion 114*h*. The slab waveguide portion 114*h* has a plurality of different thicknesses (including, for example, thicknesses $T_1$, $T_2$, $T_3$), which can improve the modulation efficiency, leading to reduced modulation loss and extinction ratio. Meanwhile, the rib waveguide portion 113*h* may have a plurality of different heights (including, for example, heights $H_1$, $H_2$, $H_3$). In some embodiments, the ring waveguide 11*h* may include a coupling region 115 and a resonating region 118. The coupling region 115 is adjacent to the bus waveguide 12*h*. The resonating region 118 is far away from the bus waveguide 12*h*. The thickness (e.g., $T_1$) of the slab waveguide portion 114*h* in the coupling region 115 can be different from the thickness (e.g., $T_2$) of the slab waveguide portion 114*h* in the resonating region 118. In some embodiments, the thickness (e.g., $T_1$) of the slab waveguide portion 114*h* in the coupling region 115 (FIG. 15A) can be greater than the thickness (e.g., $T_2$) of the slab waveguide portion 114*h* in the resonating region 118 (FIG. 15B). The thickness (e.g., $T_1$) of the slab waveguide portion 114*h* in the coupling region 115 (FIG. 15A) can be 1 nm to 10 μm. The thickness (e.g., $T_2$) of the slab waveguide portion 114*h* in the resonating region 118 (FIG. 15B) can be 1 nm to 10 μm. In some embodiments, the slab waveguide portion 114*h* in the resonating region 118 can have at least two different thicknesses (including, for example, the thicknesses $T_2$ (FIG. 15B) and $T_3$ (FIG. 15C)).

As shown in FIGS. 15A-15C, the height (e.g., $H_1$) of the rib waveguide portion 113*h* in the coupling region 115 can be different from the height (e.g., $H_2$) of the rib waveguide portion 113*h* in the resonating region 118. In some embodiments, the height (e.g., $H_1$) of the rib waveguide portion 113*h* in the coupling region 115 (FIG. 15A) can be less than the height (e.g., $H_2$) of the rib waveguide portion 113*h* in the resonating region 118 (FIG. 15B). In some embodiments, the rib waveguide portion 113*h* in the resonating region 118 can have at least two different heights (including, for example, the heights $H_2$ (FIG. 15B) and $H_3$ (FIG. 15C)).

As shown in FIG. 14 and FIG. 15A, the taper-shaped coupler 127 of the coupling structure 125 of the bus waveguide 12 of FIGS. 1 and 2 is omitted. That is, the coupling structure 125 is straight in shape. In addition, the bus waveguide 12*h* may further include a rib waveguide portion 126 protruding from a top surface of the slab waveguide portion 124. In some embodiments, a gap between the ring waveguide 11*h* and the bus waveguide 12*h* can be 1 nm to 10 μm.

Figure 16:
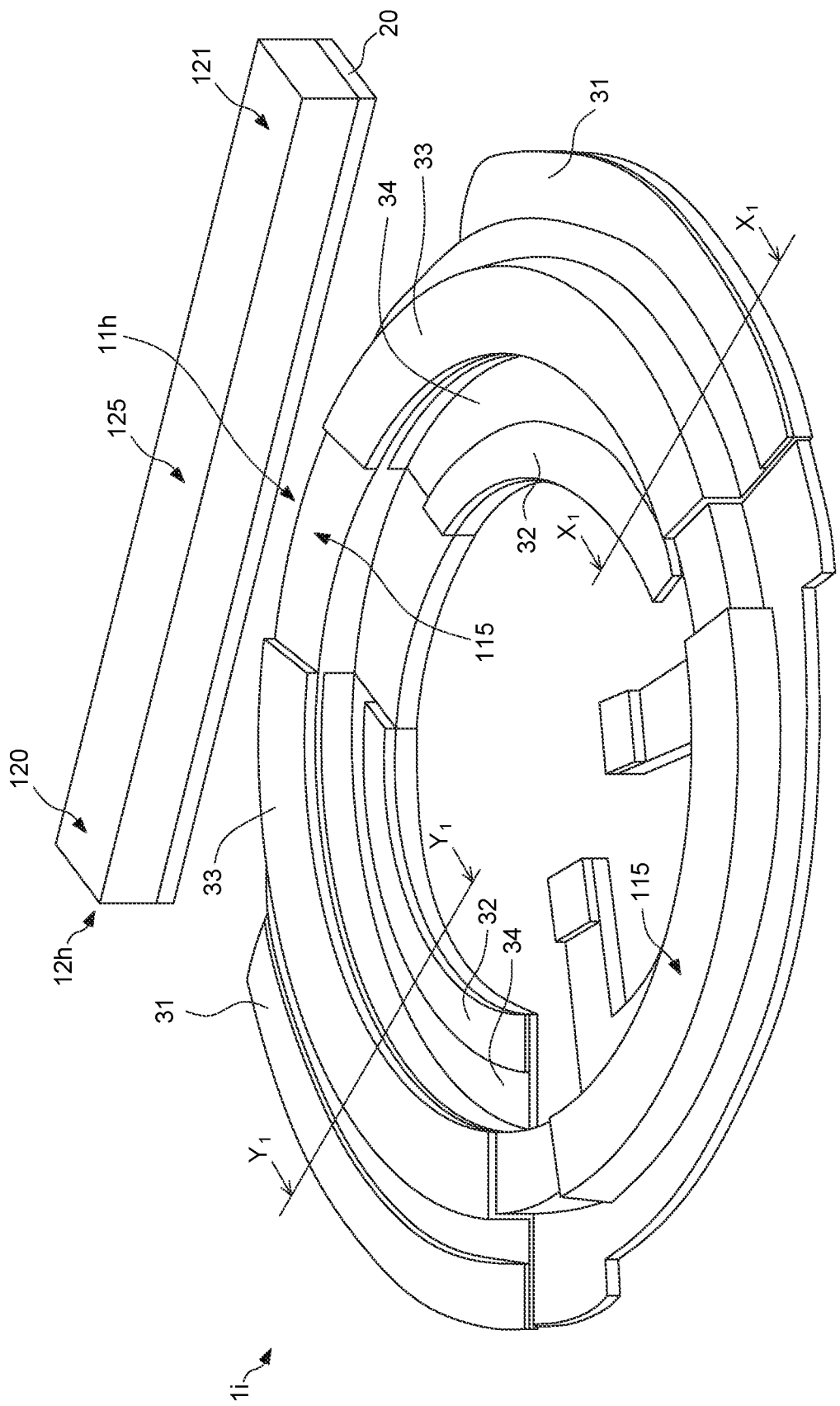
FIG. 16 illustrates a perspective view of an optical device according to some embodiments of the present disclosure.
Figure 17A:
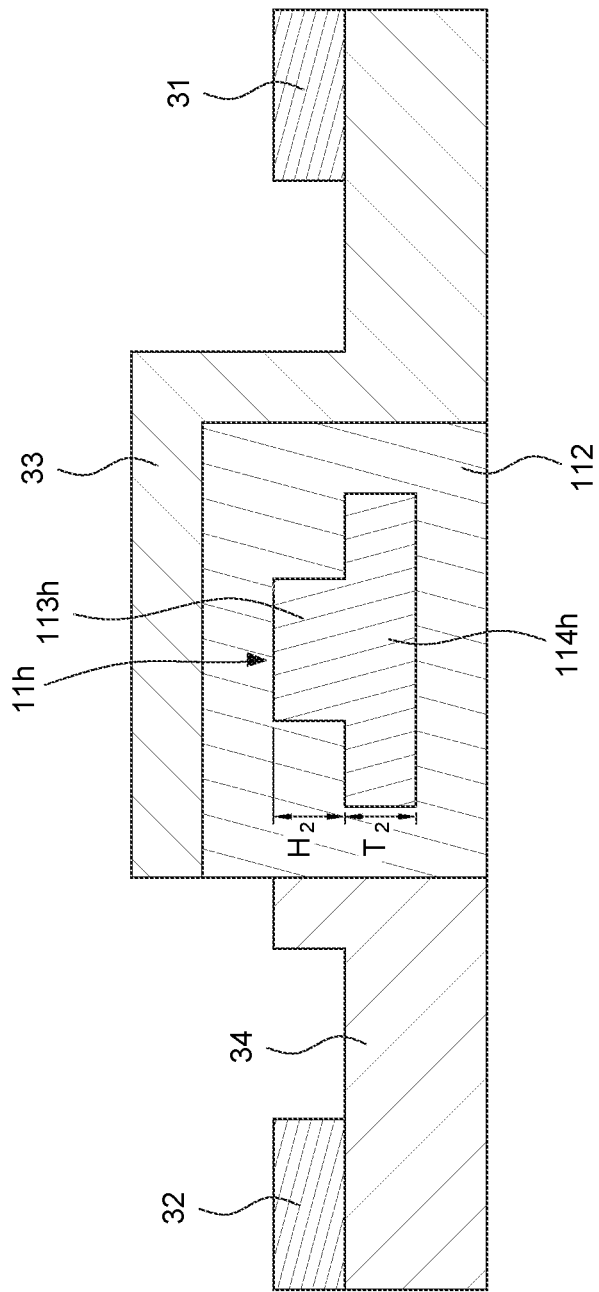
FIG. 17A illustrates a cross-sectional view along line $X_1$-$X_1$ of FIG. 16.
Figure 17B:
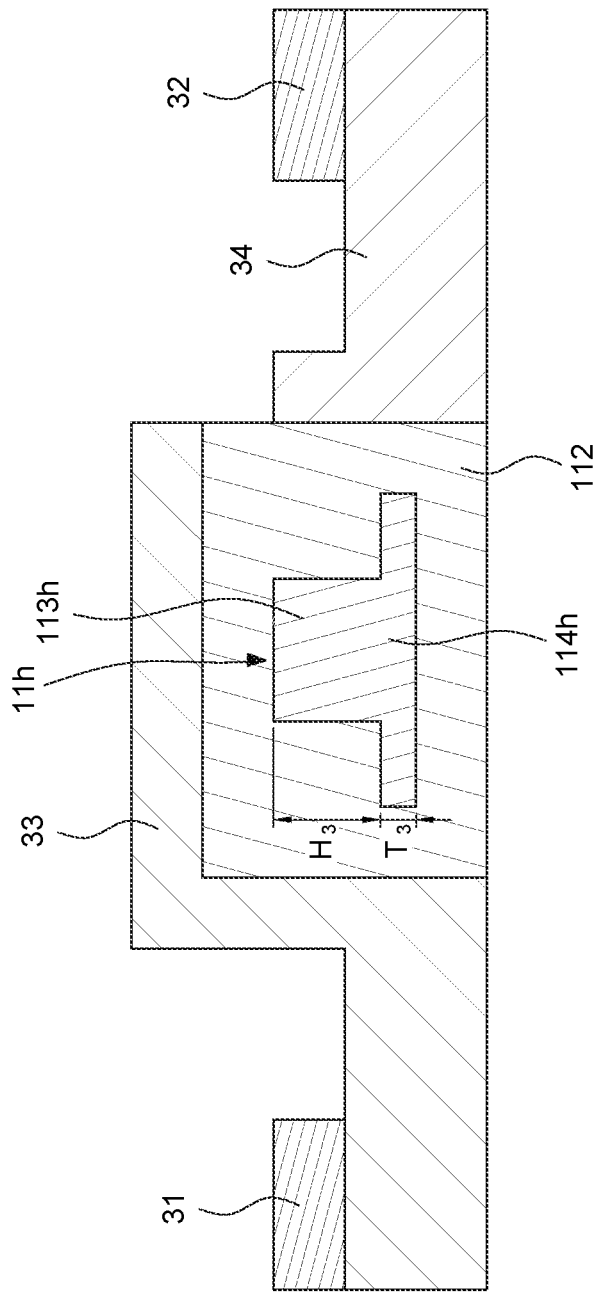
FIG. 17B illustrates a cross-sectional view along line $Y_1$-$Y_1$ of FIG. 16.

FIG. 16 illustrates a perspective view of an optical device 1*i* according to some embodiments of the present disclosure. FIG. 17A illustrates a cross-sectional view along line $X_1$-$X_1$ of FIG. 16. FIG. 17B illustrates a cross-sectional view along line $Y_1$-$Y_1$ of FIG. 16. The optical device 1*i* of FIG. 16 is similar to the optical device 1*h* of FIG. 13, except that the optical device 1*i* further includes a plurality of modulator junctions 33, a plurality of modulator heaters 34 and a plurality of electrodes (including, for example, first electrodes 31 and second electrodes 32). The optical device 1*i* can be, for example, a ring modulator. As shown in FIG. 16, the modulator junctions 33 and the modulator heaters 34 are disposed around the ring waveguide 11*h*. In some embodiments, as shown in FIGS. 17A and 17B, the modulator junctions 33 and the modulator heaters 34 can correspond to different positions of the slab waveguide portion 114*h* (including, for example, the position with the thickness $T_2$ and the position with the thickness $T_3$). A material of the modulator junction 33 can be n-type silicon. A material of the modulator heater 34 can be p-type silicon. The first electrodes 31 are disposed on the modulator junctions 33. The second electrodes 32 are disposed on the modulator heaters 34. The modulation efficiency of the optical device 1*i* (e.g., the ring modulator) can be improved by adjusting the thickness of the slab waveguide portion 114*h*, leading to reduced modulation loss and extinction ratio.

Figure 18:
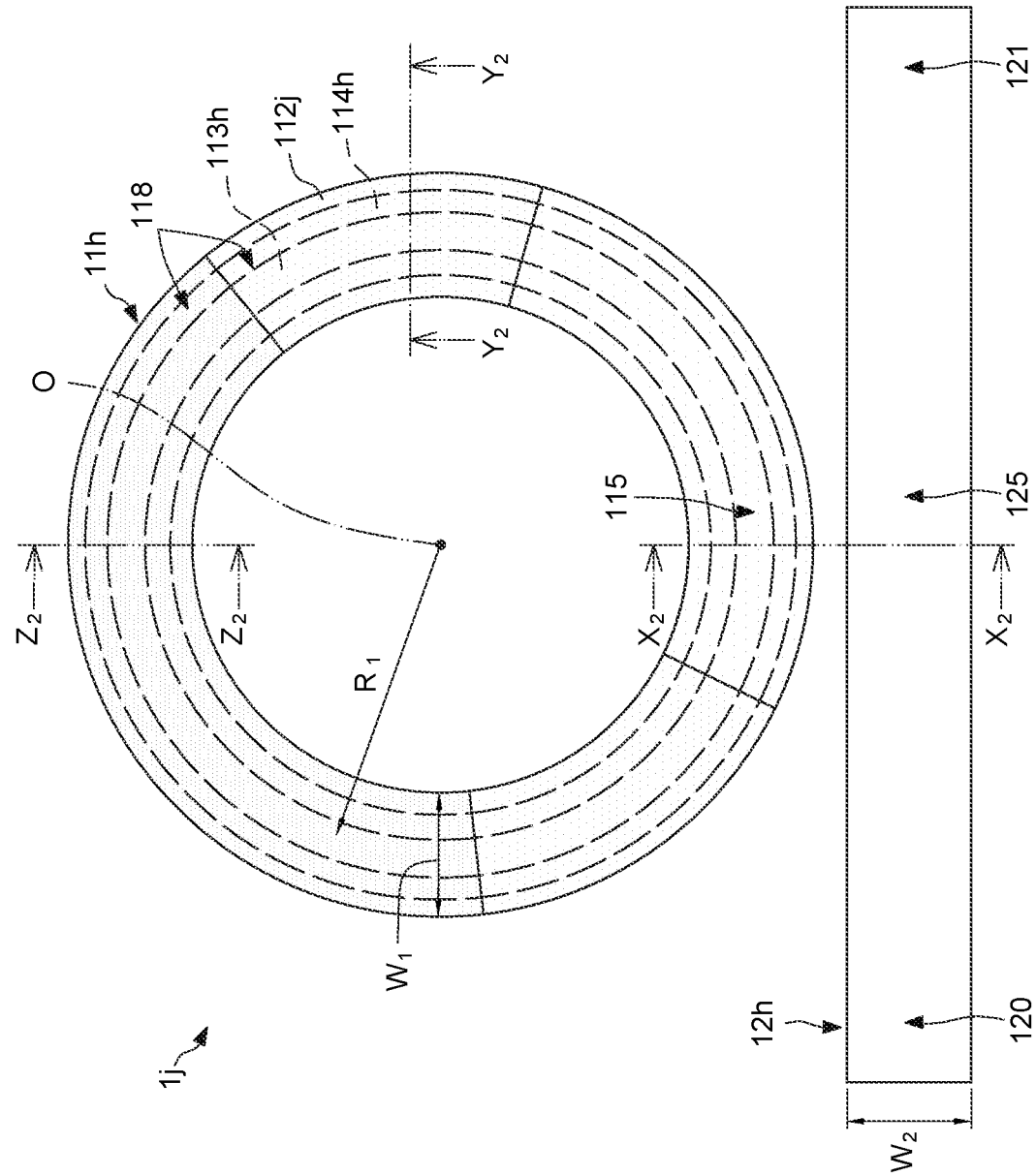
FIG. 18 illustrates a top view of an optical device according to some embodiments of the present disclosure.
Figure 19A:
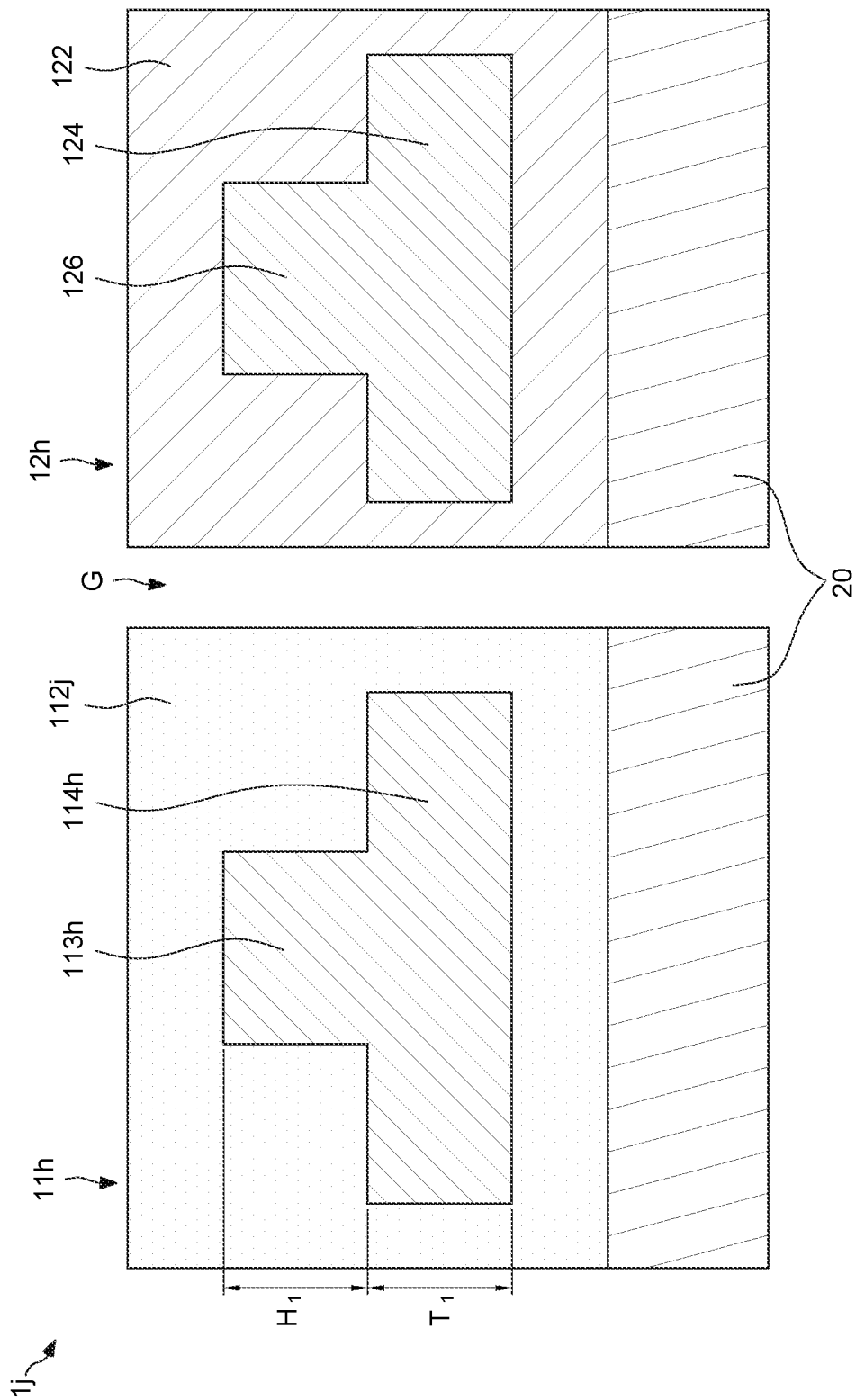
FIG. 19A illustrates a cross-sectional view along line $X_2$-$X_2$ of FIG. 18.
Figure 19B:
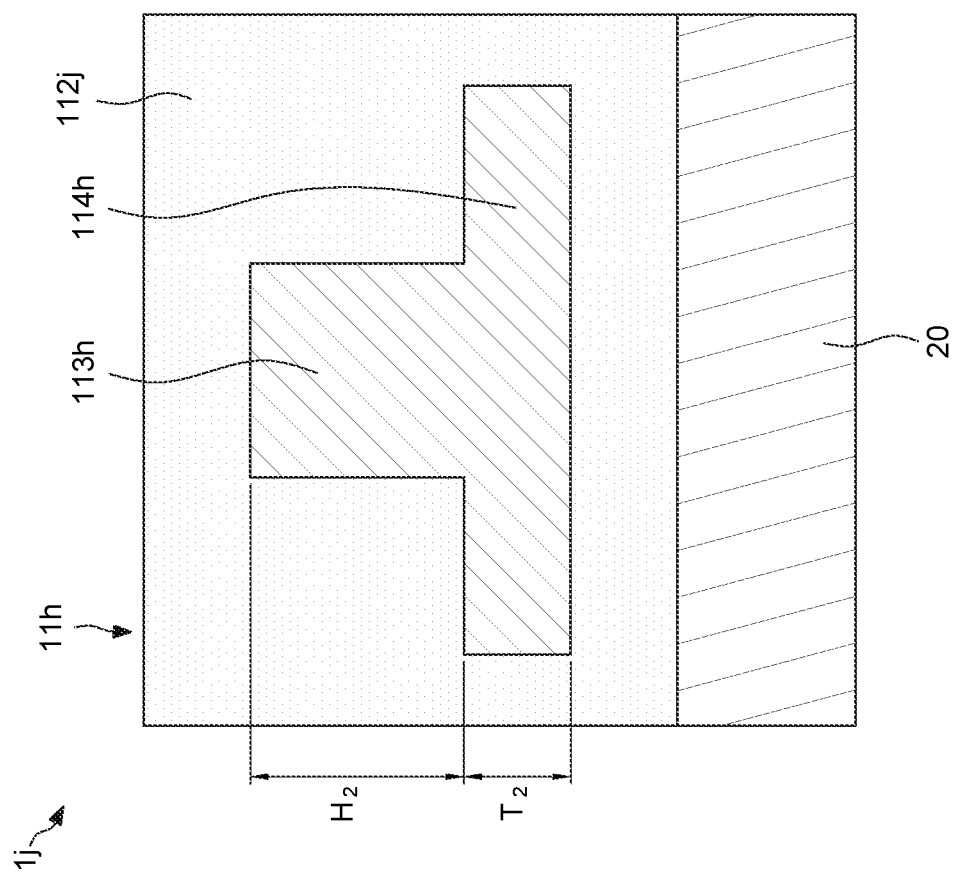
FIG. 19B illustrates a cross-sectional view along line $Y_2$-$Y_2$ of FIG. 18.
Figure 19C:
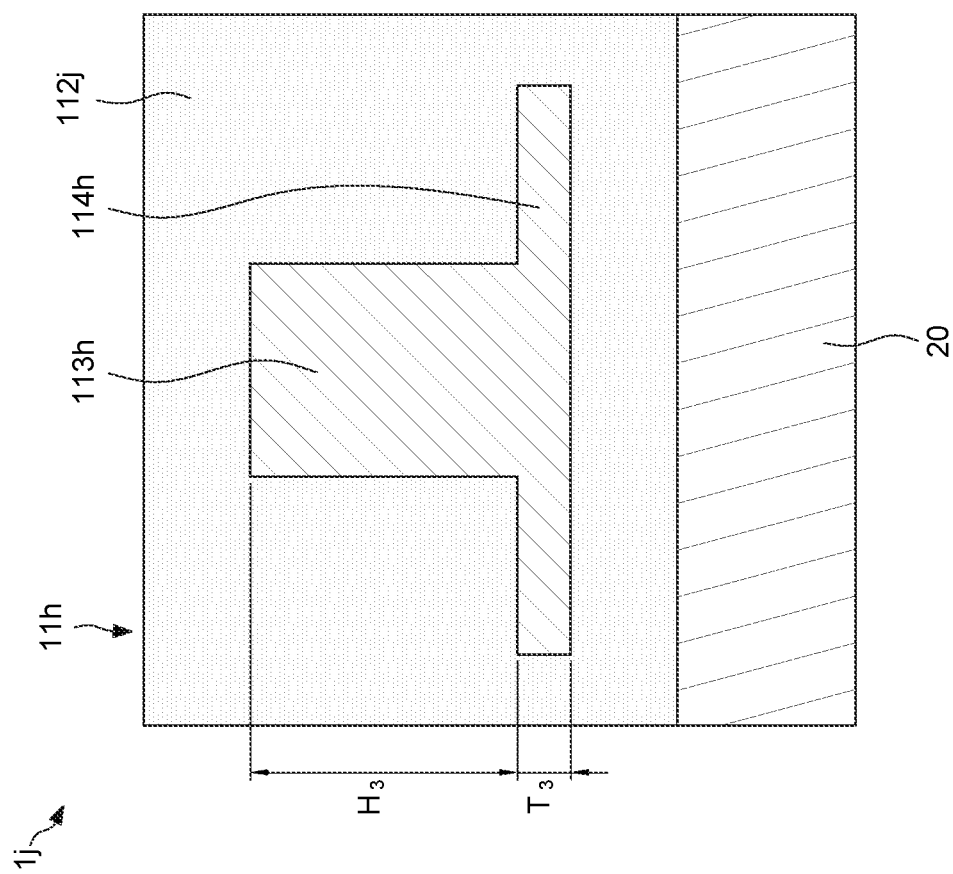
FIG. 19C illustrates a cross-sectional view along line $Z_2$-$Z_2$ of FIG. 18.

FIG. 18 illustrates a top view of an optical device 1*j* according to some embodiments of the present disclosure. FIG. 19A illustrates a cross-sectional view along line $X_2$-$X_2$ of FIG. 18. FIG. 19B illustrates a cross-sectional view along line $Y_2$-$Y_2$ of FIG. 18. FIG. 19C illustrates a cross-sectional view along line $Z_2$-$Z_2$ of FIG. 18. The optical device 1*j* of FIG. 18 is similar to the optical device 1*h* of FIG. 14, except that the cladding material 112*j* has a plurality of different dielectric constants. The optical device 1*j* can be a ring resonator and applied to a ring modulator. As shown in FIGS. 18, the dielectric constant of the cladding material 112*j* in the coupling region 115 can be different from the dielectric constant of the cladding material 112*j* in the resonating region 118. In some embodiments, the cladding material 112*j* in the resonating region 118 can have at least two different dielectric constants. The dielectric constant of the cladding material 112*j* can be 1 to 10.

In some embodiments, as shown in FIGS. 18 and 19A, the cladding material 112*j* in the coupling region 115 can cover the slab waveguide portion 114*h* with the thickness $T_1$ and the rib waveguide portion 113*h* with the height $H_1$. As shown in FIGS. 18, 19B and 19C, the cladding material 112*j* in the resonating region 118 can cover the slab waveguide portion 114*h* with the thickness $T_2$, the slab waveguide portion 114*h* with the thickness $T_3$, the rib waveguide portion 113*h* with the height $H_2$ and the rib waveguide portion 113*h* with the height $H_3$. Therefore, the modulation efficiency of the optical device 1*j* can be improved by adjusting the dielectric constant of the cladding material 112*j*, leading to reduced modulation loss and extinction ratio.

Some embodiments of the present disclosure provide an optical device. The optical device includes a ring waveguide and a bus waveguide. The ring waveguide includes a coupling region. The bus waveguide is disposed adjacent to and spaced apart from the coupling region of the ring waveguide. The bus waveguide includes a coupling structure corresponding to the coupling region. The coupling structure includes a taper-shaped coupler recessed from a side surface of the bus waveguide. A center of curvature of the taper-shaped coupler overlaps a center of the ring waveguide. A radius of curvature of the taper-shaped coupler is greater than a radius of the ring waveguide. In a cross-sectional view, the taper-shaped coupler includes a central angle whose vertex is the center of the ring waveguide with two radii lines intersecting at two distinct points on the side surface of the bus waveguide. A length of the taper-shaped coupler is equal to a product of the central angle and the radius of curvature of the taper-shaped coupler. The central angle is greater than 0 degree and less than 180 degrees. A width of the bus waveguide is different from a width of the ring waveguide. An arc-shaped gap is between the coupling region and the coupling structure. The arc-shaped gap has a consistent width. A coupling material covers the arc-shaped gap. The bus waveguide further includes an input portion and an output portion opposite to the input portion, the coupling structure is between the input portion and the output portion. The coupling structure includes a subwavelength coupler constituted by a plurality of waveguide dots spaced a pitch from each other. A coupling material covers the subwavelength coupler.

Some embodiments of the present disclosure provide an optical device. The optical device includes a ring waveguide and a bus waveguide. The ring waveguide has a plurality of different radii of curvature in profile. The bus waveguide is disposed adjacent to and spaced apart from the ring waveguide. The ring waveguide includes a plurality of resonating zones connected to each other through a corner zone. The radius of curvature of the resonating zone is different from the radius of curvature of the corner zone. A width of the resonating zone is different from a width of the corner zone. The width of the resonating zone gradually increases from a center of the resonating zone toward the corner zone.

Some embodiments of the present disclosure provide an optical device. The optical device includes a ring waveguide and a bus waveguide. The ring waveguide includes a cladding material and a slab waveguide portion embedded in the cladding material. The slab waveguide portion has at least two different thicknesses. The bus waveguide is disposed adjacent to and spaced apart from the ring waveguide. The ring waveguide includes a coupling region adjacent to the bus waveguide and a resonating region far away from the bus waveguide. The thickness of the slab waveguide portion in the coupling region is different from the thickness of the slab waveguide portion in the resonating region. The ring waveguide further includes a rib waveguide portion protruding from a top surface of the slab waveguide portion. The rib waveguide portion has at least two different heights. The height of the rib waveguide portion in the coupling region is different from the height of the rib waveguide portion in the resonating region. The cladding material has at least two different dielectric constants.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device, comprising:
a ring waveguide including a coupling region; and
a bus waveguide disposed adjacent to and spaced apart from the coupling region of the ring waveguide, and including a coupling structure corresponding to the coupling region, wherein the coupling structure includes a taper-shaped coupler recessed from a side surface of the bus waveguide, a center of curvature of the taper-shaped coupler overlaps a center of the ring waveguide, and a radius of curvature of the taper-shaped coupler is greater than a radius of the ring waveguide.

2. The optical device of claim 1, wherein in a cross-sectional view, the taper-shaped coupler includes a central angle whose vertex is the center of the ring waveguide with two radii lines intersecting at two distinct points on the side surface of the bus waveguide, and a length of the taper-shaped coupler is equal to a product of the central angle and the radius of curvature of the taper-shaped coupler.

3. The optical device of claim 2, wherein the central angle is greater than 0 degree and less than 180 degrees.

4. The optical device of claim 1, wherein a width of the bus waveguide is different from a width of the ring waveguide.

5. The optical device of claim 1, wherein an arc-shaped gap is between the coupling region and the coupling structure.

6. The optical device of claim 5, wherein the arc-shaped gap has a consistent width.

7. The optical device of claim 5, further comprising a coupling material covering the arc-shaped gap.

8. The optical device of claim 1, wherein the bus waveguide further includes an input portion and an output portion opposite to the input portion, the coupling structure is between the input portion and the output portion, and the coupling structure includes a subwavelength coupler constituted by a plurality of waveguide dots spaced a pitch from each other.

9. The optical device of claim 8, further comprising a coupling material covering the subwavelength coupler.

10. An optical device, comprising:
a ring waveguide having a plurality of different radii of curvature in profile, and including a cladding material, a slab waveguide portion embedded in the cladding material, and a rib waveguide portion protruding from a top surface of the slab waveguide portion, wherein the rib waveguide portion has at least two different heights; and
a bus waveguide disposed adjacent to and spaced apart from the ring waveguide.

11. The optical device of claim 10, wherein the ring waveguide includes a plurality of resonating zones connected to each other through a corner zone, and the radius of curvature of the resonating zone is different from the radius of curvature of the corner zone.

12. The optical device of claim 10, wherein the ring waveguide includes a plurality of resonating zones connected to each other through a corner zone, and a width of the resonating zone is different from a width of the corner zone.

13. The optical device of claim 12, wherein the width of the resonating zone gradually increases from a center of the resonating zone toward the corner zone.

14. The optical device of claim 10, further comprising a coupling material covering the ring waveguide and the bus waveguide.

15. The optical device of claim 14, wherein the cladding material of the ring waveguide is a portion of the coupling material.

16. The optical device of claim 14, wherein the bus waveguide includes a cladding material, and the cladding material of the bus waveguide is a portion of the coupling material.

17. An optical device, comprising:
a ring waveguide including a cladding material, a slab waveguide portion embedded in the cladding material, and a rib waveguide portion protruding from a top surface of the slab waveguide portion, wherein the slab waveguide portion has at least two different thicknesses, and the rib waveguide portion has at least two different heights; and
a bus waveguide disposed adjacent to and spaced apart from the ring waveguide.

18. The optical device of claim 17, wherein the ring waveguide includes a coupling region adjacent to the bus waveguide and a resonating region far away from the bus waveguide, and the thickness of the slab waveguide portion in the coupling region is different from the thickness of the slab waveguide portion in the resonating region.

19. The optical device of claim 17, wherein the ring waveguide includes a coupling region adjacent to the bus waveguide and a resonating region far away from the bus waveguide, and the height of the rib waveguide portion in the coupling region is different from the height of the rib waveguide portion in the resonating region.

20. The optical device of claim 17, wherein the cladding material has at least two different dielectric constants.

\* \* \* \* \*